US011815696B1

(12) United States Patent
Sabapathy et al.

(10) Patent No.: US 11,815,696 B1
(45) Date of Patent: Nov. 14, 2023

(54) APPARATUS AND METHODS FOR GENERATING NON-GAUSSIAN STATES FROM GAUSSIAN STATES

(71) Applicant: Xanadu Quantum Technologies Inc., Toronto (CA)

(72) Inventors: Krishnakumar Sabapathy, Toronto (CA); Haoyu Qi, Toronto (CA); Joshua Abe Izaac, Toronto (CA); Christian Weedbrook, Toronto (CA); Daiqin Su, Toronto (CA); Casey Myers, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 341 days.

(21) Appl. No.: 16/997,601

(22) Filed: Aug. 19, 2020

Related U.S. Application Data

(60) Provisional application No. 62/899,369, filed on Sep. 12, 2019.

(51) Int. Cl.
*G02B 27/09* (2006.01)
*G02F 1/01* (2006.01)

(52) U.S. Cl.
CPC ....... *G02B 27/0927* (2013.01); *G02F 1/0121* (2013.01); *G02F 2201/58* (2013.01)

(58) Field of Classification Search
CPC ...... G02B 27/10; G02B 27/0927; G02B 6/14; G02B 6/12; G02B 6/125; G02B 6/12007;

(Continued)

(56) References Cited

U.S. PATENT DOCUMENTS 10,649,307 B2  5/2020 Vernon et al.
10,809,592 B2  10/2020 Dutt et al.
(Continued)

FOREIGN PATENT DOCUMENTS

CN  103791845 A  5/2014
CN  108957903 A  12/2018
(Continued)

OTHER PUBLICATIONS https://github.com/XanaduAI/strawberryfields; retrieved on Oct. 15, 2021, 4 pages.

(Continued)

*Primary Examiner* — Jie Lei
(74) *Attorney, Agent, or Firm* — Cooley LLP

(57) ABSTRACT

An apparatus includes an optical circuit having at least one reconfigurable beamsplitter and is configured to receive a plurality of input optical modes in a Gaussian state and generate a plurality of output optical modes. The apparatus also includes at least one detector optically coupled with the optical circuit and configured to perform a non-Gaussian measurement of a first output optical mode from the plurality of output optical modes. The non-Gaussian measurement of the first output optical mode is configured to cause a second output optical mode from the plurality of output optical modes to be in a first non-Gaussian state. The apparatus also includes a controller operatively coupled to the optical circuit and configured to change a setting of the at least one reconfigurable beamsplitter to cause the second output optical mode from the plurality of output optical modes to be in a second non-Gaussian state.

13 Claims, 21 Drawing Sheets

(58) Field of Classification Search
CPC ..... G02F 1/21; G02F 1/13; G02F 1/31; G02F 1/0121; G02F 1/225; G02F 1/313; G02F 1/365; G02F 1/212; G02F 2201/58; G02F 2001/212; G06N 10/00; G06N 20/00; G06E 3/00; G01J 1/42
USPC .......... 359/10, 11, 278, 279, 578, 579, 583; 385/1, 2, 8, 9
See application file for complete search history.

(56) References Cited

U.S. PATENT DOCUMENTS

| | | |
|---|---|---|
| 11,593,699 B2 | 2/2023 | Bradler et al. |
| 2014/0299743 A1* | 10/2014 | Miller .................. G02F 1/0136 359/629 |
| 2015/0354938 A1 | 12/2015 | Mower et al. |
| 2016/0156466 A1 | 6/2016 | Kirby et al. |
| 2016/0290897 A1 | 10/2016 | Bakharev et al. |
| 2022/0051124 A1 | 2/2022 | Bradler et al. |
| 2023/0042396 A1 | 2/2023 | Dhand et al. |

FOREIGN PATENT DOCUMENTS

| | | |
|---|---|---|
| CN | 109477938 A | 3/2019 |
| EP | 3444657 A1 | 2/2019 |
| JP | 2003-256668 A | 9/2003 |
| WO | WO-2020232546 A1 | 11/2020 |

OTHER PUBLICATIONS

Killoran, N. et al., "Strawberry Fields: A Software Platform for Photonic Quantum Computing," Quantum, 3:129 (2019); arXiv:1804.03159v1 Apr. 9, 2018, 25 pages.

Sabapathy, K. et al., "Production of photonic universal quantum gates enhanced by machine learning," Phys. Rev. A, 100:012326 (2019); arXiv:1809.04680v2 Sep. 5, 2019, 11 pages.

International Search Report and Written Opinion dated Aug. 18, 2020 for International Application No. PCT/CA2020/050675, 6 pages.

First Office Action dated Mar. 23, 2022 for Chinese Application No. 202080037617.4, with English translation, 46 pages.

Arrazola, J. M. & Bromley, T. R., "Using Gaussian Boson Sampling to Find Dense Subgraphs," Phys. Rev. Lett., 121:030503 (2018), 6 pages; https://doi.org/10.1103/PhysRevLett.121.030503.

Brádler, K. et al. "Gaussian boson sampling for perfect matchings of arbitrary graphs." Physical Review A, 98:032310 (2018), 17 pages; doi:10.1103/PhysRevA.98.032310.

Brod, D. J. et al., "Photonic implementation of boson sampling: a review," Advanced Photonics, 1(3):034001 (2019), 34 pages; https://doi.org/10.1117/1.AP.1.3.034001.

Crespi, A. et al., "Experimental boson sampling in arbitrary integrated photon circuits," Nature Photonics, 7:545 (2013), 10 pages; https://link.aps.org/doi/10.1103/PhysRevA.47.733.

Hamilton, C. S. et al., "Gaussian Boson Sampling," Phys. Rev. Lett., 119:170501 (2017), 5 pages; https://doi.org/10.48550/arXiv.1612.01199.

Huh, J. et al., "Boson sampling for molecular vibronic spectra," Nature Photonics, 9:615-620 (2015), and Methods, 1 page.

Lita, A. E. et al., "Superconducting transition-edge sensors optimized for high-efficiency photon-number resolving detectors," Proc. SPIE 7681, Advance Photon Counting Techniques IV, 76810D (2010), 11 pages; doi:10.1117/12.852221.

Lo, C. F. & Sollie, R., "Generalized multimode squeezed states," Physical Review A, 47(1):733-735 (1993).

Carolan, J. et al., "Universal linear optics," Science, 349 (6249): 771-716 (2015).

Dutt, et al., On-Chip Optical Squeezing, Physical Review Applied. Sep. 2013, 8 pages.

Dutt, On-Chip Quantum and Nonlinear Optics from Squeezing to Spectroscopy, Dissertation, Aug. 2017, 210 pages.

Extended European Search Report for European Application No. 20810403.4 dated Mar. 20, 2023, 10 pages.

Office Action for Chinese application No. CN20208037617.4, dated Aug. 24, 2022, 19 pages.

Paesani, S., et al., "Generation and sampling of quantum states of light in a silicon chip", arxiv.org, Cornell University Library, 201 Olin Library Cornell University Ithaca, NY 14853, Dec. 7, 2018 (Dec. 7, 2018), XP081486882, DOI: 10.1038/S41567-019-0567-8 * Supplementary material, p. 1-5.

* cited by examiner

| a | $r_1$ | $r_2$ | $\phi_1$ | $\phi_2$ | $d_1$ | $d_2$ | $\phi'_1$ | $\phi'_2$ | $\theta$ | $\psi$ |
|---|---|---|---|---|---|---|---|---|---|---|
| 0.3 | 0.37 | -0.37 | -3.08 | 0.59 | -0.25 | 0.35 | 0.77 | -0.98 | -0.64 | 2.26 |
| 0.38 | -0.43 | -0.43 | -1.72 | -1.64 | -0.36 | -0.3 | -2.05 | -3.25 | 2.25 | -1.93 |
| 0.46 | -0.48 | -0.48 | -1.34 | 0.50 | 0.34 | -0.39 | -0.14 | -0.93 | 2.40 | 2.85 |
| 0.53 | -0.5 | 0.46 | 1.73 | 0.37 | 0.4 | -0.29 | -0.64 | -1.2 | 0.97 | -0.77 |
| 0.61 | -0.54 | -0.58 | 0.55 | 0.65 | 0.39 | -0.41 | 0.75 | 2.28 | -0.68 | -1.26 |
| 0.67 | -0.34 | -0.48 | 3.1 | 0 | -0.14 | 0.30 | 1.55 | -1.57 | 0.61 | -3.12 |
| 0.77 | 0.35 | -0.51 | 0.85 | 0.01 | 0.14 | -0.4 | -1.14 | 1.57 | 0.63 | 2.72 |
| 0.84 | 0.28 | -0.46 | -0.57 | 0 | 0.07 | 0.38 | 4.42 | -1.57 | 0.62 | -2.86 |
| 0.92 | -0.53 | 0.34 | -1.84 | 0.02 | -0.4 | 0.12 | -2.49 | 7.9 | -0.93 | 0.93 |
| 1 | -0.23 | 0.43 | -0.97 | 3.14 | 0.01 | -0.38 | -0.47 | -1.57 | 3.76 | -1.09 |

FIG. 12

| a | $r_1$ | $r_2$ | $r_3$ | $\phi_1$ | $\phi_2$ | $\phi_3$ | $d_1$ | $d_2$ | $d_3$ | $\theta_1$ | $\theta_2$ | $\theta_3$ | $\phi_1$ | $\phi_2$ | $\phi_3$ |
|---|---|---|---|---|---|---|---|---|---|---|---|---|---|---|---|
| 0.3 | -0.27 | 0.65 | 0.66 | -4.14 | 0.53 | -1.94 | 0.38 | -0.19 | -0.47 | 2.29 | -4.19 | 3.5 | 2.77 | 0.59 | -0.2 |
| 0.38 | -0.53 | -0.75 | -0.55 | 7.19 | 10.16 | 10.73 | 0.51 | -0.03 | 0.53 | 2.3 | -2.04 | -4.11 | -0.29 | -1.99 | -0.89 |
| 0.46 | -0.75 | -0.54 | 0.27 | 1.23 | -5.31 | 1.53 | -0.04 | 0.38 | 0.63 | 0.7 | 1.97 | -0.88 | -1.62 | 0.72 | -1.79 |
| 0.53 | 0.71 | 0.67 | -0.42 | -2.07 | 0.06 | -3.79 | -0.02 | 0.34 | 0.02 | -1.57 | 0.68 | 2.5 | 0.53 | -4.51 | 0.72 |
| 0.61 | 0.72 | 0.65 | -0.45 | 0.23 | 0.49 | -3.81 | 0 | -0.33 | -0.01 | -1.57 | -2.46 | 0.63 | -1.81 | -0.22 | 0.42 |
| 0.67 | 0.52 | 0.56 | 0.74 | 0.09 | 3.35 | -3.26 | 0.64 | -0.33 | 0.02 | -3.31 | 2.29 | 2.63 | -3.33 | 1.41 | -6.29 |
| 0.77 | -0.55 | 0.73 | 0.03 | 1.14 | 0.98 | -3.03 | 0.34 | 0.11 | 0.51 | -2.3 | -1.96 | 0.69 | -3.22 | 4.32 | -4.07 |
| 0.84 | 0.74 | 0.54 | -0.48 | 0.5 | -5.29 | 2.73 | -0.01 | -0.36 | 0.01 | -1.52 | 0.7 | -3.8 | -0.95 | -1.06 | -1.24 |
| 0.92 | -0.54 | 0.49 | 0.72 | -0.44 | 2.36 | 3.14 | 0.15 | -0.48 | 0.25 | -1.3 | 2.27 | 0.67 | -2.13 | 3.94 | 1.99 |
| 1 | 0.66 | -0.38 | -0.76 | 3.36 | -0.73 | 0.4 | -0.05 | -0.82 | 0 | 1.56 | -2.32 | 0.61 | -3.67 | -0.97 | -0.71 |

*FIG. 13*

| $\alpha$ | $\mathcal{F}_{max}$ | $\zeta_1$ | $c_0/c_2$ | $p_{max}$ | $\zeta_{01}$ | $\zeta_{02}$ | $\theta$ |
|---|---|---|---|---|---|---|---|
| 0.25 | 1.0000 | 0.0115 | 27.717 | 18.12 % | 1.1587 | −0.0136 | −1.3065 |
| 0.50 | 1.0000 | 0.0458 | 6.9428 | 15.49 % | 1.1936 | −0.0499 | −1.2351 |
| 0.75 | 0.9999 | 0.1025 | 3.1112 | 12.87 % | 1.2447 | −0.0982 | −1.0927 |
| 1.00 | 0.9999 | 0.1796 | 1.7885 | 11.20 % | 1.3073 | −0.1474 | −0.9686 |
| 1.25 | 0.9991 | 0.2730 | 1.1932 | 10.55 % | 1.3780 | −0.1898 | −0.8606 |
| 1.50 | 0.9958 | 0.3763 | 0.8841 | 10.51 % | 1.4546 | −0.2228 | −0.7668 |
| 1.75 | 0.9870 | 0.4832 | 0.7082 | 10.73 % | 1.5340 | −0.2404 | −0.6859 |
| 2.00 | 0.9709 | 0.5884 | 0.6011 | 11.01 % | 1.6150 | −0.2626 | −0.6170 |

*FIG. 16*

| States | Fid. | Prob. | (T, D) |
|---|---|---|---|
| $|0\rangle + |2\rangle$ | 1 | 10.48% | (2, 1) |
| Cat | ~1.0 | 10 – 20% | (2, 1) |
| GKP | 0.818 | 1.1% | (3, 2) |
| Weak cubic | 1 | ~4 – 6% | (3, 2) |
| $W_N$ | 1 | 25% | (N+1, 1) |
| NOON (N=2) | 1 | 6.25% | (4, 2) |
| NOON (N=3) | 1 | 1.54% | (5, 3) |
| NOON (N=4) | 1 | 0.55% | (6, 4) |

*FIG. 18*

APPARATUS AND METHODS FOR GENERATING NON-GAUSSIAN STATES FROM GAUSSIAN STATES

CROSS-REFERENCE TO RELATED APPLICATIONS

This application claims the benefit of U.S. Provisional Patent Application No. 62/899,369, filed Sep. 12, 2019 and titled "Apparatus and Methods for Generating Non-Gaussian States from Gaussian States," the entire content of which is incorporated by reference herein in its entirety for all purposes.

FIELD

One or more embodiments relate to generation of non-Gaussian states from Gaussian states.

BACKGROUND

Quantum information processing based on continuous variable (CV) systems can be broadly divided into the Gaussian and the non-Gaussian domains using the corresponding states and gates. The distribution of quadratures in phase space of a Gaussian state follows Gaussian statistics. A Gaussian unitary, or more generally a Gaussian operation, transforms a Gaussian state into another Gaussian state. In quantum information architectures based on photonic platforms, the Gaussian states and Gaussian unitaries can be generated and implemented deterministically and thus are readily achievable experimentally.

Non-Gaussian states and gates are beneficial to many applications, such as quantum optical lithography, quantum metrology, entanglement distribution, error correction, phase estimation, bosonic codes, quantum communication and nonclassical optics, cloning, and in particular to universal quantum computation. Generating non-Gaussian states and implementing non-Gaussian gates deterministically, however, are much more challenging because the interaction Hamiltonians, which are third or higher order polynomials of quadrature operators, are usually very weak. For example, the optical Kerr nonlinearity (i.e., third order nonlinearity) is far smaller than what would otherwise be useful for implementing a non-Gaussian gate. Known approaches to generate non-Gaussian states, such as quantum scissors and photon subtraction, typically have low fidelity and/or low success probability. For example, the efficiency of sequential photon-subtraction techniques is usually around only $10^{-4}$%.

SUMMARY

Some embodiments described herein relate generally to generation of non-Gaussian states, and, in particular, to generation of non-Gaussian states from Gaussian states using photon number resolving detectors. In some embodiments, an apparatus includes an optical circuit having at least one reconfigurable beamsplitter. The optical circuit is configured to receive a plurality of input optical modes in a Gaussian state and generate a plurality of output optical modes. The apparatus also includes at least one detector optically coupled with the optical circuit and configured to perform a non-Gaussian measurement of a first output optical mode from the plurality of output optical modes. The non-Gaussian measurement of the first output optical mode is configured to cause a second output optical mode from the plurality of output optical modes to be in a first non-Gaussian state. The apparatus also includes a controller operatively coupled to the optical circuit and configured to change a setting of the at least one reconfigurable beamsplitter to cause the second output optical mode from the plurality of output optical modes to be in a second non-Gaussian state.

In some embodiments, a method includes estimating at least one expected output optical mode of an optical circuit based on a target output optical mode in a non-Gaussian state. The at least one expected output optical mode and the target output optical mode are to be generated by the optical circuit that includes at least one reconfigurable beamsplitter. The method also includes estimating a setting of the optical circuit to produce the at least one expected output optical mode at a first output port of the optical circuit and estimating parameters of a plurality of input optical modes of the optical circuit to produce the at least one expected output optical mode. The plurality of the input optical modes is in a Gaussian state. The method also includes generating the target output optical mode at a second output port of the optical circuit using the setting and the parameters.

In some embodiments, an apparatus includes an optical circuit configured to receive a light beam having a first optical mode in a Gaussian state and a light beam having a second optical mode in a Gaussian state, the optical circuit including at least one reconfigurable optical component configured to entangle the first optical mode and the second optical mode. The optical circuit is configured to generate a light beam in a first output optical mode and a light beam in a second output optical mode. The apparatus also includes at least one detector optically coupled with the optical circuit and configured to perform a non-Gaussian measurement of the first output optical mode that causes the second output optical mode to be in a first non-Gaussian state at a first time. A controller is operatively coupled to the optical circuit and configured to change a setting of the at least one reconfigurable optical component to cause the second output optical mode to be in a second non-Gaussian state at a second time.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

FIG. 12 is a table listing the optimal circuit parameters achieved from machine learning for a two-mode circuit to generate cubic phase states, according to an embodiment.

FIG. 13 is a table listing circuit parameters of a three-mode circuit achieved from machine learning for generating cubic phase states, according to an embodiment.

FIG. 16 is a table listing parameters that are achieved from machine learning and used for generating an even cat state by detecting a two-mode Gaussian state with a photon number resolving detector, according to an embodiment.

FIG. 18 is table listing fidelity and success probability achieved in generating various types of non-Gaussian states, according to an embodiment.

DETAILED DESCRIPTION

In view of the challenges in generating non-Gaussian states, apparatus, systems, and methods described herein employ an approach for probabilistic and near-deterministic production of non-Gaussian states by measuring a subset of multimode Gaussian states, via photon-number-resolving detectors, generated by a reconfigurable optical circuit (e.g., an interferometer). The measurement of the subset of output modes places the rest of the output modes into non-Gaussian states and the exact parameters of the produced non-Gaussian states depend on the measurement result. The measurement result, in turn, can be adjusted by the setting of the optical circuit and the input of the optical circuit. The reconfigurability of the optical circuit allows this approach to increase the fidelity and the success probability of producing a desired non-Gaussian state by optimizing the setting of the optical circuit as well as optimizing the parameters of the input states that are fed into the optical circuit.

As used herein, "optical modes" are orthogonal solutions of the wave equation that do not interfere with one another (i.e., the energy or optical power of a linear superposition of modes is equal to the sum of the energy or the optical power of the individual modes). Only the photons within a given optical mode are coherent and interfere (for identical polarization). A number of photons in each optical mode describes the transport of energy or information, and the quality of light thereof. Spatial modes are optical modes that are transverse to a direction of light propagation (cross-section and divergence), whereas temporal modes are optical modes in the direction of light propagation (time and frequency).

Figure 1A:
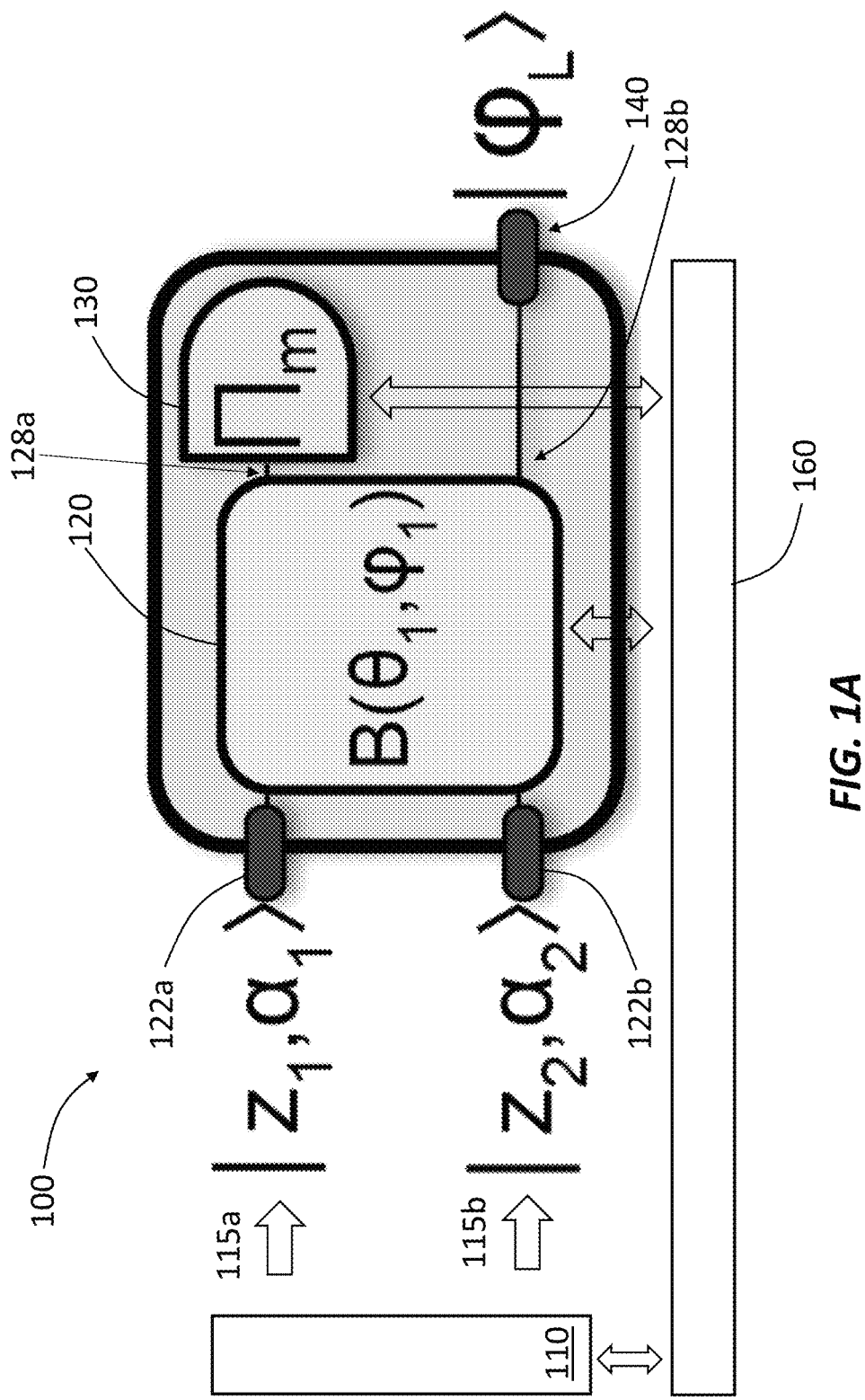
FIG. 1A shows a schematic of an apparatus for generating non-Gaussian states from Gaussian states, according to an embodiment.

FIG. 1A shows a schematic of an apparatus 100 for generating non-Gaussian states from Gaussian states, according to an embodiment. The apparatus 100 includes an optical circuit 120 having at least one reconfigurable beamsplitter 150 (see FIG. 1B for detailed structure). The optical circuit 120 is configured to receive input optical modes 115a and 115b in Gaussian states at input ports 122a and 122b, respectively. The optical circuit 120 generates output optical modes at output ports 128a and 128b. The input optical modes 115a and 115b can be provided by a light source 110 and include squeezed displaced light. The squeezing factor and displacement of the input optical modes 115a/115b are denoted as $z_i$, $\alpha_i$, respectively, where i=a, b.

The apparatus 100 also includes a detector 130 optically coupled with the optical circuit 120 and configured to perform a non-Gaussian measurement of a first output optical mode at the first output port 128a. The optical circuit 120 is configured to create entanglement between different optical modes at the output ports 128a and 128b, and the non-Gaussian measurement of one output optical mode at one output port 128a can cause the other output optical mode at the other output port 128b to be in a non-Gaussian state 140 (also referred to as non-Gaussian output 140, labelled as $|\phi_L\rangle$ in FIG. 1A). The exact parameters (e.g., quadrature distribution) of the non-Gaussian output 140 depends on the measurement result (e.g., number of photons) at the first output port 128a, which in turn depends on the setting of the optical circuit 120 and the parameters of the input optical modes 115a and 115b (e.g., squeezing factor and displacement). In some embodiments, the detector 130 is configured to measure the photon number in the output optical mode at the first output port 128a. In some embodiments, the non-Gaussian measurement performed by the detector 130 includes threshold detection (the detector 130 is this case is also referred to as threshold detector, such as an avalanche photodiode).

The apparatus 100 also includes a controller 160 operatively coupled to the light source 110, the optical circuit 120, and the detector 130. The controller 160 is configured to change the setting of the optical circuit 120 to change the parameters of the non-Gaussian output 140 (e.g., to produce a desired output). In some embodiments, the controller 160 is configured to adjust the setting of the optical circuit 120

(and/or the parameters of the input optical modes 115a/115b) so as to increase the fidelity of the non-Gaussian output 140 with respect to a target output. In some embodiments, the controller 160 is configured to adjust the setting of the optical circuit 120 (and/or the parameters of the input optical modes 115a/115b) so as to increase the success probability for the optical circuit 120 to produce a target output. In some embodiments, the controller 160 is configured to estimate the setting of the optical circuit 120 and/or the parameters of the input optical modes 115a/115b for a target output (see more details below).

The light source 110 in the apparatus is configured to provide the input optical modes 115a and 115b that are usually squeezed and displaced. In some embodiments, the light source 110 can include an optical parametric amplifier (OPA) that generates squeezed displaced light from light in a coherent state or vacuum state by using optical nonlinear interactions. In some embodiments, the light source 110 can generate the input optical modes via a resonant structure to facilitate the nonlinear interaction. More information about the light source 110 using resonant structures can be found in, for example, U.S. patent application Ser. No. 16/104,424, entitled "METHODS AND APPARATUS FOR PRODUCING HIGHLY TUNABLE SQUEEZED LIGHT," filed Aug. 17, 2018, which is incorporated herein in its entirety.

Figure 1B:
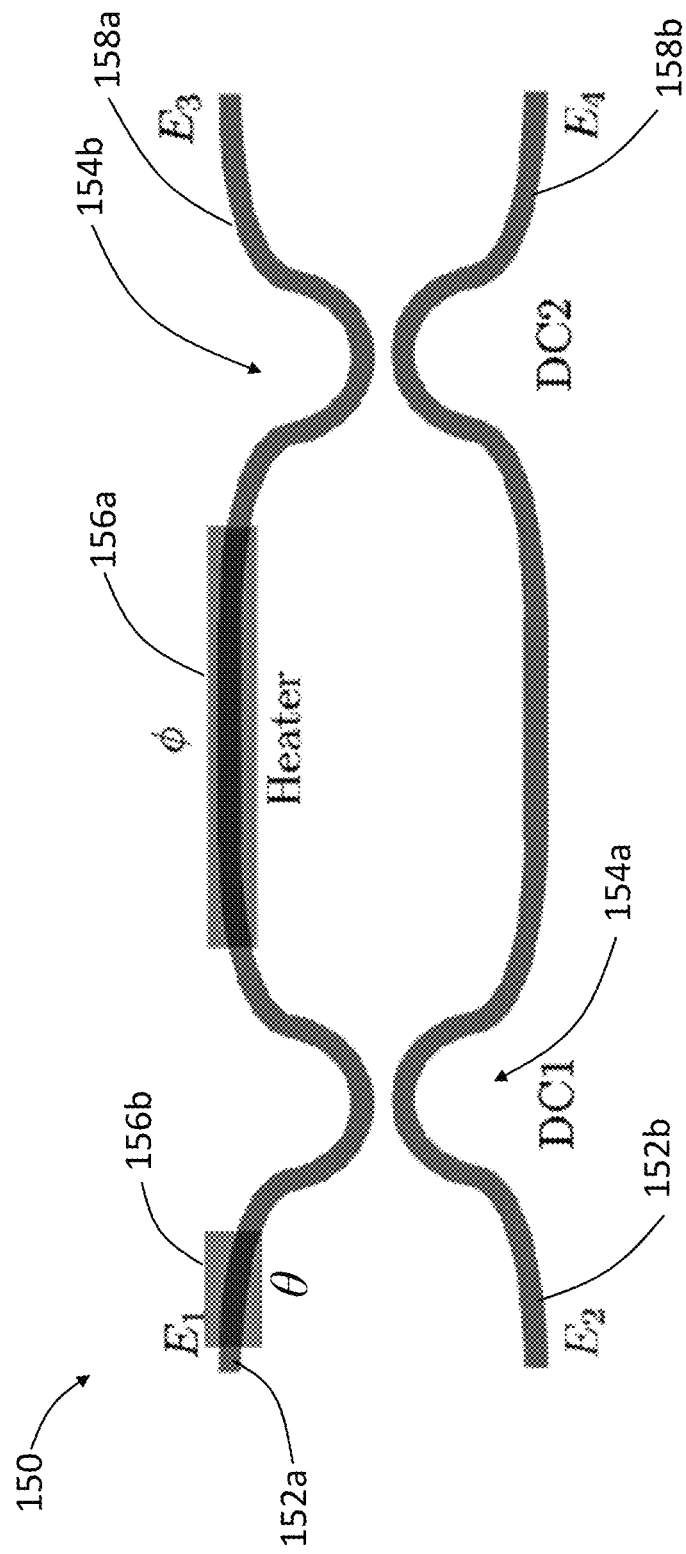
FIG. 1B shows a schematic of a reconfigurable beamsplitter that can be used in an apparatus for generating non-Gaussian states, according to an embodiment.

FIG. 1B shows a schematic of a reconfigurable beamsplitter (RBS) 150 that can be used in the apparatus 100 for generating non-Gaussian states, according to an embodiment. The RBS 150 includes a first directional coupler (DC1) 154a and a second direction coupler (DC2) 154b placed sequentially, with the relative optical phase 4) (implemented by a first phase shifter 156a) between the intervening waveguide. In some embodiments, the first phase shifter 156a can include a thermo-optical phase shifter that can apply different amounts of phase shift via the electric current through the phase shifter 156a. Other techniques of controlling this phase, such as electro-optic phase shifters, can also be used.

The RBS 150 also includes two input ports 152a and 152b, as well as two output ports 158a and 158b. In addition, a second phase shifter 156b is placed on one input 152a of the RBS 150. The two phase shifters 156a and 156b, via different phase settings, allow the RBS 150 to achieve an arbitrary split ratio, i.e., a tunable transmission between the input fields ($E_1$, $E_2$) and the output fields ($E_3$, $E_4$).

The detector 130 is configured to measure the photon number in the output optical mode at the output port 128a. In some embodiments, the detector 130 can include a photon number resolving detector (PNRD), such as a superconducting nanowire photon number resolving detector, a photomultiplier tube (PMT), a single photon avalanche photo diode (SAPD), a transition-edge sensor (TES), or any other appropriate detector.

The controller 160 in the apparatus 100 can include any suitable processing device configured to run or execute a set of instructions or code (e.g., stored in the memory) such as a general-purpose processor (GPP), a field programmable gate array (FPGA), a central processing unit (CPU), an accelerated processing unit (APU), a graphics processor unit (GPU), an Application Specific Integrated Circuit (ASIC), and/or the like. Such a processor can run or execute a set of instructions or code stored in the memory associated with using a PC application, a mobile application, an internet web browser, a cellular and/or wireless communication (via a network), and/or the like. Although shown and described with reference to FIG. 1B as being reconfigurable, in other embodiments the beamsplitter 150 can have a "fixed" (i.e., not reconfigurable) configuration and can include one or multiple beamsplitters.

FIG. 1A shows two input ports 122a/122b and two output ports 128a/128b for illustrative purposes only. In practice, any other number of input ports and output ports can be used (see FIGS. 2-5).

Figure 2:
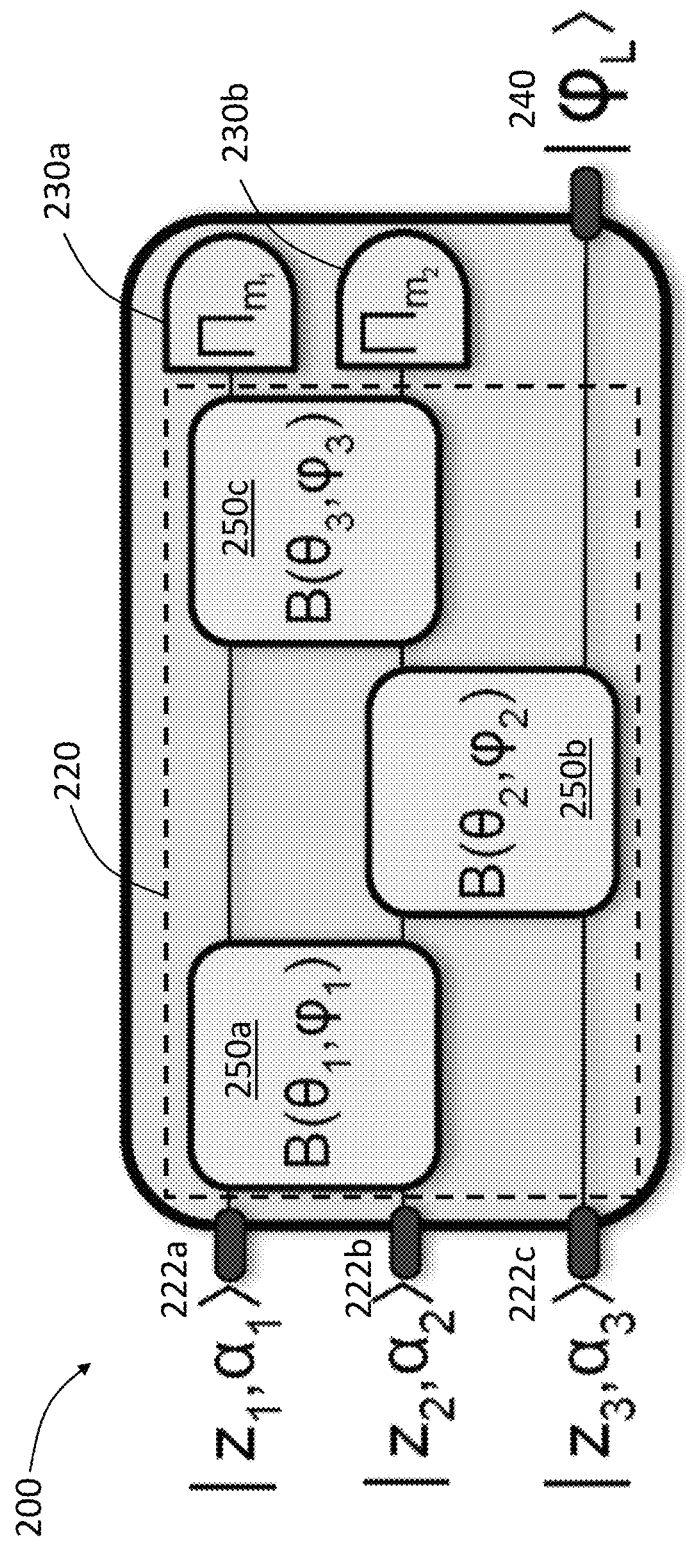
FIG. 2 shows a schematic of a three-mode apparatus for generating non-Gaussian states from Gaussian states, according to an embodiment.

FIG. 2 shows a schematic of a three-mode apparatus 200 for generating a non-Gaussian output from three Gaussian input modes, according to an embodiment. The apparatus 200 includes an optical circuit 220 having three reconfigurable beamsplitters 250a, 250b, and 250c interconnected by waveguides. The optical circuit 220 has three input ports 222a, 222b, and 222c configured to receive three input optical modes characterized by squeezing factors zi and displacement αi, where i=1, 2, 3. The optical circuit 220 is configured to perform a unitary transformation of the input optical modes and generate entanglements among these input optical modes. The apparatus 200 also includes two detectors 230a and 230b, each of which is configured to measure the photon number in a corresponding output optical mode of the optical circuit 220. The last output optical mode, which is not measured, is the non-Gaussian output state 240 (labelled as $|\varphi_L\rangle$ in FIG. 2). Although shown and described with reference to FIG. 2 as being reconfigurable, in other embodiments one or more of the beamsplitters 250a, 250b and 250c can have a "fixed" (i.e., not reconfigurable) configuration, and each of the beamsplitters 250a, 250b and 250c can include one or multiple beamsplitters.

Figure 3:
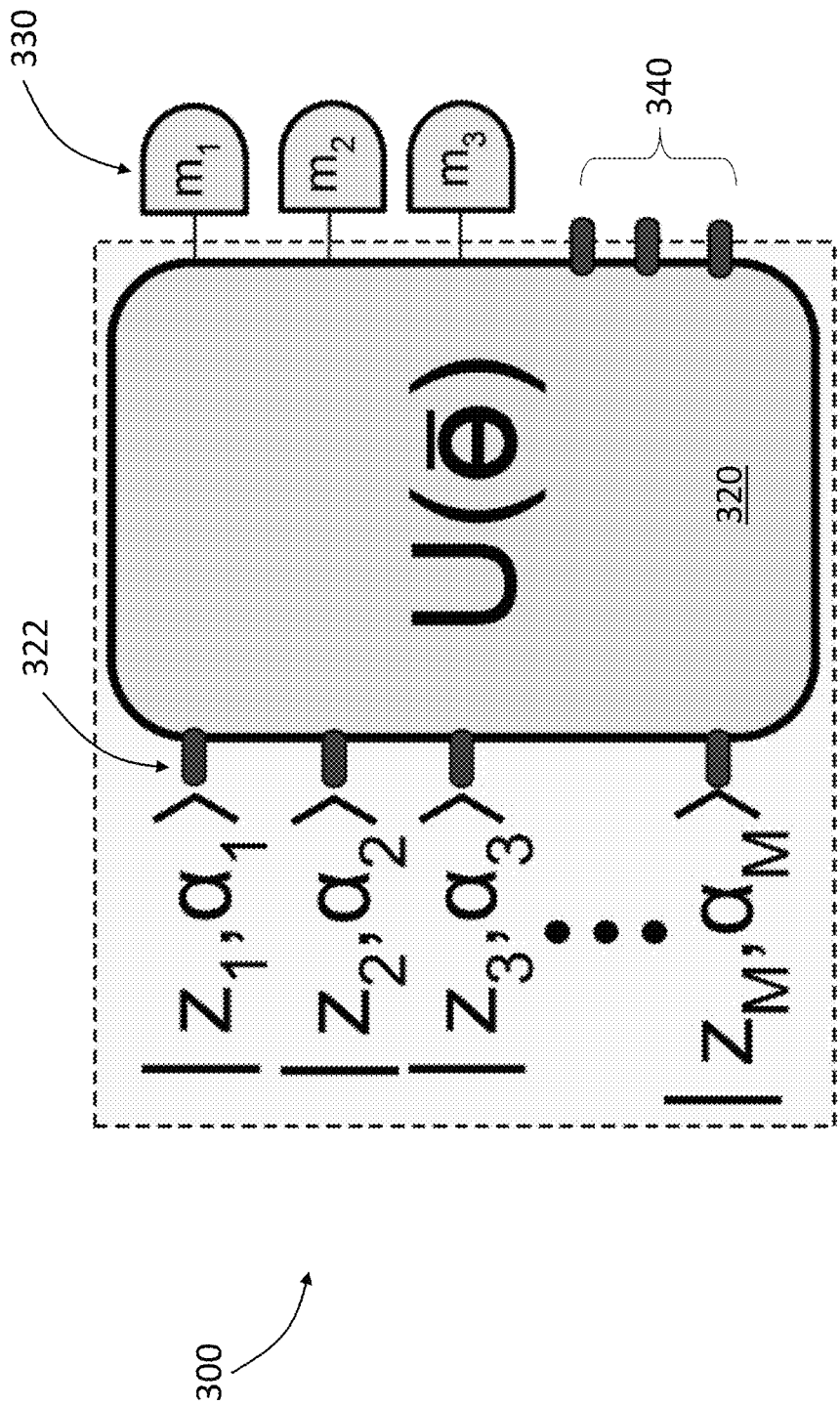
FIG. 3 shows a schematic of a multimode apparatus for generating non-Gaussian states from Gaussian states, according to an embodiment.

FIG. 3 shows a schematic of a multimode apparatus 300 for generating a multimode non-Gaussian state from multiple Gaussian input modes, according to an embodiment. The apparatus 300 includes an optical circuit 320 configured to receive multiple input optical modes (zi, αi) (i=1, 2, . . . , M, where M is the number of input optical modes) that are in a Gaussian state and perform a unitary transformation on these input optical modes. In some instances, increasing the number of input optical modes M allows the resulting apparatus to generate more complex non-Gaussian states (see, e.g., FIGS. 9A-14 and associated descriptions).

The apparatus 300 also includes multiple detectors 330 configured to measure a subset of output optical modes from the optical circuit 320. Three detectors are illustrated in FIG. 3, but the number of detectors 330 in practice can be between 1 and (M−1). The unmeasured output optical mode(s) from the optical circuit 320 form the non-Gaussian output 340 of the apparatus 300. In some embodiments, the non-Gaussian output 340 includes only one output optical mode from the optical circuit 320, and this non-Gaussian output 340 is also referred to as a single-mode non-Gaussian output. In some embodiments, the non-Gaussian output 340 includes more than one output optical mode from the optical circuit, and this non-Gaussian output 340 is also referred to as a multimode non-Gaussian output. In some embodiments, each detector in the detectors 330 is configured to measure the photon number in the corresponding output optical mode. In some embodiments, each detector in the detectors 330 is configured to perform threshold detection and the detection outcome can be a special case of combining all non-zero photon detections into one, leading to a mixed state being produced at the output (e.g., 340).

Figure 4:
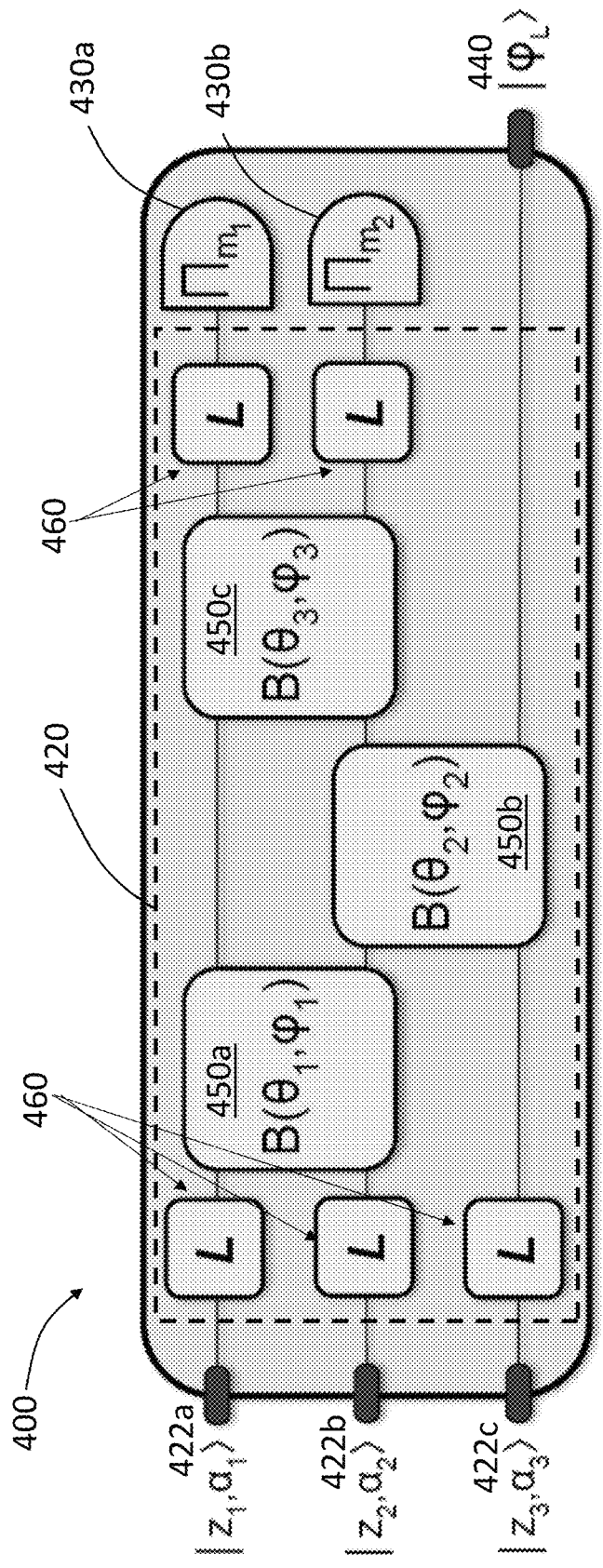
FIG. 4 shows a schematic of an apparatus including a reconfigurable optical circuit to address imperfections in generating non-Gaussian states, according to an embodiment.

FIG. 4 shows a schematic of an apparatus 400 including a reconfigurable optical circuit to address imperfections in generating non-Gaussian states, according to an embodiment. The apparatus 400 includes an optical circuit 420 having three reconfigurable beamsplitters 450a, 450b, and 450c interconnected by waveguides. The optical circuit 420 has three input ports 422a, 422b, and 422c configured to receive three input optical modes ($z_i$, (i=1, 2, 3). The optical circuit 420 is configured to perform a unitary transformation of the input optical modes and generate entanglements among these input optical modes. The apparatus 400 also includes two detectors 430a and 430b, each of which is configured to measure the photon number ($m_1$ and $m_2$, respectively) in a corresponding output optical mode of the optical circuit 420. The last output optical mode, which is not measured, is the non-Gaussian output state 440 (labelled as $|\varphi_L\rangle$ in FIG. 4).

The optical circuit 420 in the apparatus 400 also includes one or more imperfections 460 (labelled as "L") that can create losses to optical modes and therefore affect the fidelity and/or success probability of generating a target non-Gaussian output. The imperfections can be located, for example, on waveguides coupling the beamsplitters 450a to 450c. These imperfections 460, however, can be addressed at least partially by the reconfigurability of the optical circuit 420. More specifically, for a given target non-Gaussian output, a controller (e.g., similar to controller 160, not shown in FIG. 4) can be used to estimate the setting of the optical circuit 420. Such estimation can take into account the effects of the imperfections 460 and therefore maintain a high fidelity and/or high success probability. In other words, the setting of the optical circuit 420 can be adjusted to offset the effects introduced by the imperfections 460. Although shown and described with reference to FIG. 4 as being reconfigurable, in other embodiments one or more of the beamsplitters 450a, 450b, and 450c can have a "fixed" (i.e., not reconfigurable) configuration, and each of the beamsplitters 450a, 450b and 450c can include one or multiple beamsplitters.

Figure 5:
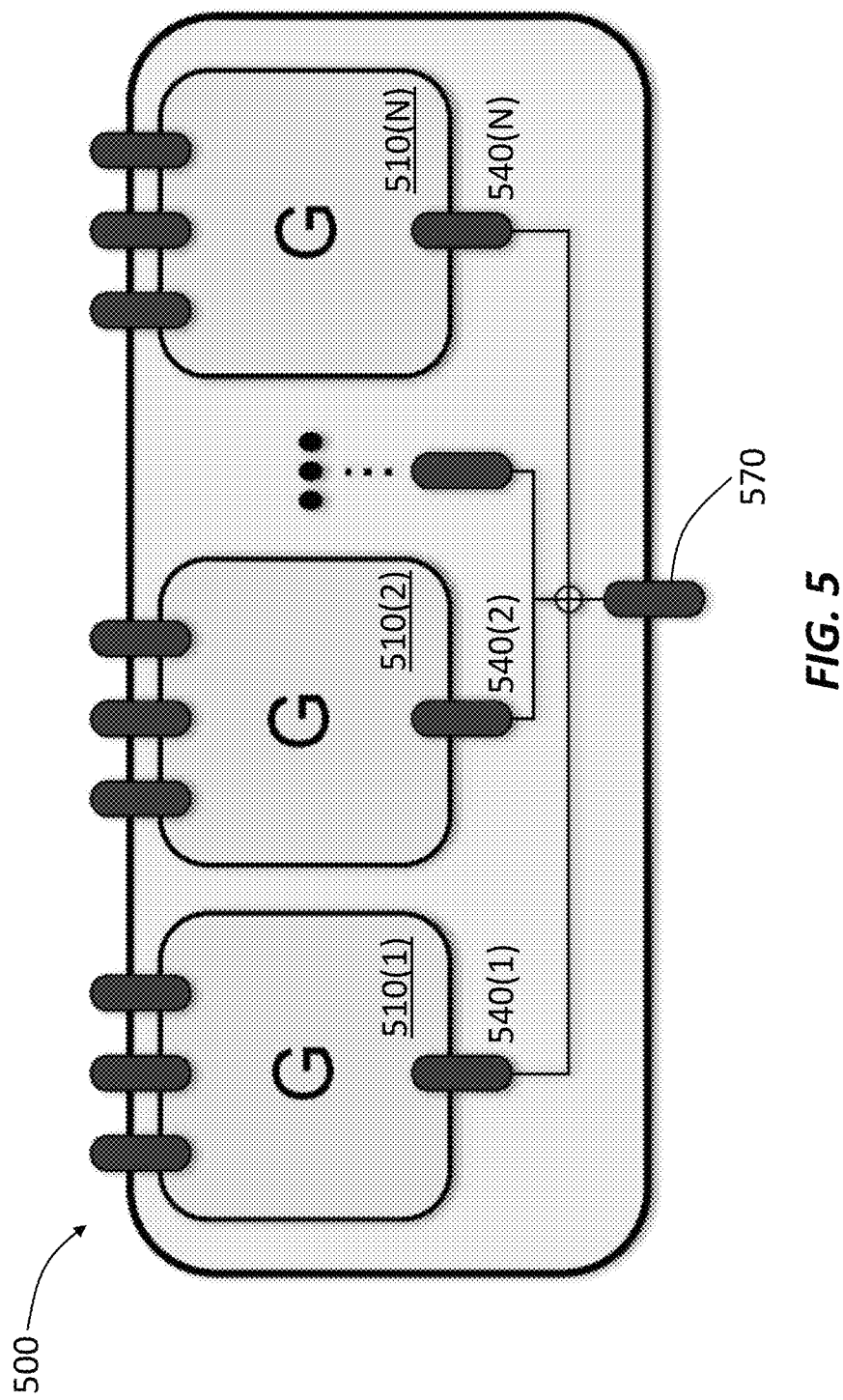
FIG. 5 shows a schematic of an apparatus for near-deterministic generation of non-Gaussian states, according to an embodiment.

FIG. 5 shows a schematic of an apparatus 500 for near-deterministic generation of non-Gaussian states, according to an embodiment. The apparatus 100-400 shown in FIGS. 1A-4 usually generate non-Gaussian states in a probabilistic manner because the generation of a target non-Gaussian state is conditioned on a particular post-selected measurement outcome (see, e.g., FIGS. 14 and 17 below). The apparatus 500 (also referred to as a quantum resource farm) can further increase the success probability of generating a target non-Gaussian state and convert the state generation process into a near-deterministic one. The apparatus 500 includes multiple optical circuits 510(1) to 510(N), where N is a positive integer number. Each optical circuit 510(i) (i=1, 2, ..., N) (also referred to as a gadget 510(i)) can be substantially identical to any of the apparatus 100-400 shown in FIGS. 1A-4 and described herein. In some embodiments, each optical circuit 510(i) is configured to operate in parallel (i.e., independently) with other optical circuits in the apparatus 500 and produce a corresponding non-Gaussian output 540(i). The non-Gaussian outputs 540(1) to 540(N) of the optical circuits 510(1) to 510(N) are all connected to an output port 570 that is configured to send one or more non-Gaussian outputs from the optical circuits 510(1) to 510(N).

The apparatus 500 can include a controller (e.g., similar to controller 160, not shown in FIG. 5) to monitor the generation of the non-Gaussian output 540(i) in each optical circuit 540(i). For example, each optical circuit 510(i) includes one or more detectors to detect a subset of output optical modes and the controller can be configured to monitor the measurement pattern (e.g., number of photons in each output optical mode). As described herein, the non-Gaussian output 540(i) can be determined by the pattern of the measured output optical modes. Therefore, the controller can identify which optical circuit 510(i) produces the proper measurement pattern and accordingly the target non-Gaussian output. The controller can then select the non-Gaussian output from this identified optical circuit to be sent out from the port 570 as the output of the entire apparatus 500. Because the apparatus 500 can include a large number of optical circuits 510(i), the probability of producing a target non-Gaussian state can be significantly improved to be close to 1 (i.e., near-deterministic).

In some embodiments, all the optical circuits 510(1) to 510(N) can be substantially identical to each other (e.g., three-mode circuits as illustrated in FIG. 5). In some embodiments, the optical circuits 510(1) to 510(N) can include different types of optical circuits. For example, some of the optical circuits can be two-mode circuits (e.g., similar to apparatus 100 shown in FIG. 1A), some of the optical circuits can be three-mode circuits (e.g., similar to apparatus 200 shown in FIG. 2), and some of the optical circuits can be multimode circuits (e.g., similar to apparatus 300 shown in FIG. 3).

In some embodiments, the apparatus 500 is configured to select (e.g., by the controller) a non-Gaussian output from only one optical circuit 510(i) as the output of the apparatus 500. In some embodiments, the apparatus 500 can be configured to select multiple non-Gaussian outputs from multiple optical circuits in 510(1) to 510(N) for further processing. In some implementations, these multiple non-Gaussian outputs can be sent to a linear interferometer to create entanglement among them. In some implementations, Schrodinger cat states can further interact to produce GKP states. In some implementations, smaller cluster states can be fused to form larger cluster states.

The number N of optical circuits that are used for near-deterministic generation of non-Gaussian states can be estimated as follows. In this estimation, N is the number of optical circuits 510(1) to 510(N) in the apparatus 500, p is the probability of success of producing a target non-Gaussian state from each one of the optical circuits 510(1) to 510(N), and ε is the error that captures the degree of determinism of the entire apparatus 500. The probability for the apparatus 500 to produce the target non-Gaussian state is denoted P(F) and is given by the union of events of any of the optical circuit preparing this target non-Gaussian state. In the case where the target non-Gaussian state is prepared by more than one optical circuit, this case is still counted as a useful event. Therefore, the success probability P(F) is identical to the complement event probability that none of the optical circuits produces the target non-Gaussian state, i.e., $P(F)=1-(1-p)^N$.

The apparatus 500 is still allowed to operate with the error ε (i.e., probability of failing to produce the target non-Gaussian state), so the probability P(F) can be set as $P(F) \geq 1-\varepsilon$. Therefore, the minimum number of optical circuits $n_{min}$ is given by: $n_{min}=[\log(\varepsilon)/\log(1-p)]$, where [y] refers to the smallest integer≥y. In some embodiments, the number of optical circuits N in the apparatus 500 can still be less than $n_{min}$, in which case the apparatus 500 generates a target non-Gaussian state with reduced success probability (i.e., less than 1−ε).

Figure 6:
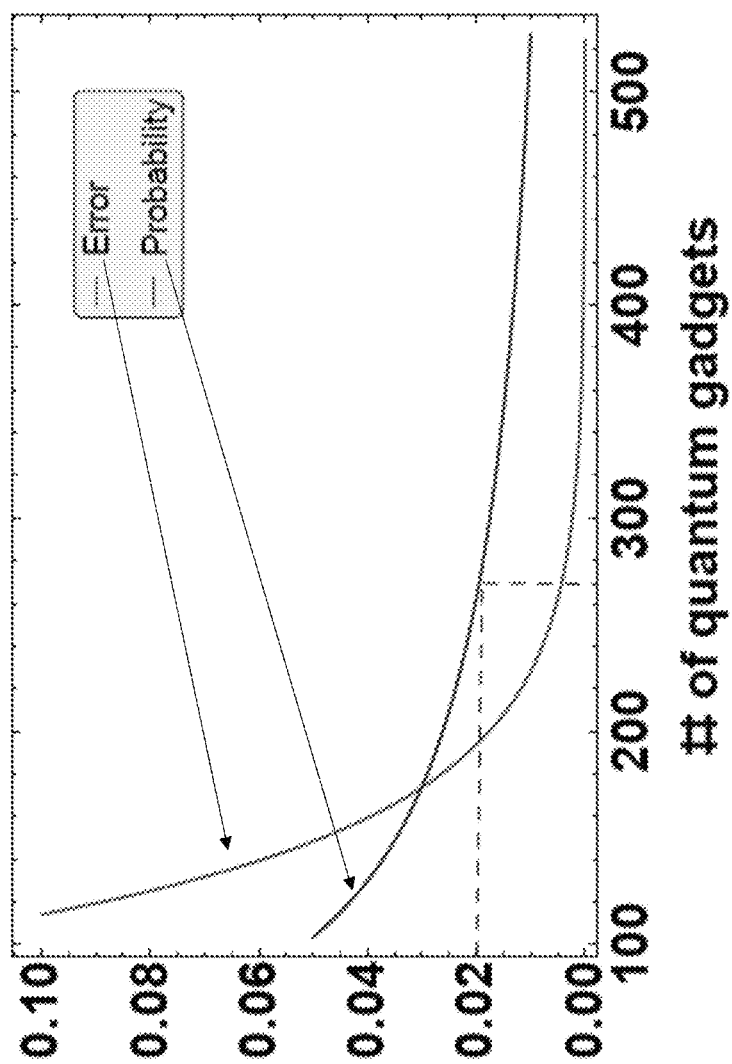
FIG. 6 shows calculated error and success probability for generating a target non-Gaussian state as a function of the number of optical circuits in the apparatus shown in FIG. 5, according to an embodiment.

FIG. 6 shows calculated error and success probability for generating a target non-Gaussian state as a function of the number of optical circuits (labelled as "# of quantum gadgets") in the apparatus 500, according to an embodiment. The top curve shows the error ε as a function of the number of optical circuits at a fixed probability of p=0.02 of state preparation from each individual optical circuit. The bottom curve shows the probability p as a function of the number of optical circuits at a fixed error $\varepsilon=5\times10^{-3}$. For p=0.02 (i.e., 2% efficiency) and P(F)=0.995 ($\varepsilon=0.005$), $n_{min}$ is about 260 (illustrated by the dotted lines in FIG. 6).

The apparatus 100-500 shown in FIGS. 1A-5 can be configured for various purposes. In some embodiments, the apparatus 100-500 can be configured to generate random non-Gaussian states by taking advantage of the probabilistic process of each individual optical circuit. The exact parameters of the generated non-Gaussian state can be derived from the measurements of other output optical modes from the optical circuits (see more details below). In some embodiments, the apparatus 100-500 can be configured to generate a target non-Gaussian state. In these embodiments, the setting of the optical circuits and the parameters of the input Gaussian states can be inversely estimated or approximated based on the given target non-Gaussian state. Such estimation can be performed, for example, by a classical computer (e.g., controller 160 shown in FIG. 1A) and then the estimated setting/parameters can be implemented in the apparatus 100-500 to generate the target non-Gaussian state (i.e., fidelity of 1) or an output state that approximates the target non-Gaussian state (i.e., fidelity less than 1).

In some embodiments, the apparatus 100-500 can be configured to produce multiple output states (e.g., each of which is sent out from a corresponding output port) and these output states can undergo further processing. In some implementations, multiple output states from one or more optical circuits can be entangled together to create one or more entangled modes. In some implementations, multiple output states from one or more optical circuits can be averaged for coarse-graining. In these implementations, a success event can be defined when any instance in a predetermined set of multiple output states is obtained and the success probability is a sum of the success probability of each individual outcome patterns.

In some embodiments, the apparatus 100-500 can be configured for classical and/or quantum post-processing. In some implementations, Gaussian operations can be performed on the non-Gaussian output state based on a preset measurement pattern. For example, a first Gaussian gate can be applied for a first measurement pattern and a second Gaussian gate can be applied for a second measurement pattern. In some implementations, classical/quantum post processing can be used for applying a table with various possible outcomes along with Gaussian operations. The apparatus 100-500 can be used without a predetermined measurement outcome. Depending on the instance of a particular outcome, one can look up this table and apply a Gaussian operation. This technique can be used to improve state preparation (e.g., in combination with the coarse-graining technique described herein). These techniques can also be used for state distillation, i.e., preparing higher quality states in noisy devices.

While the apparatus 100-500 are based on a photonic platform, the approach described herein can be applied in any continuous-variable system. For example, Bosonic modes occur in many quantum technology platforms, such as electromagnetic modes in optical cavities and free space transmission of light, superconducting circuits and microwave cavities, and motional modes in ion/atom traps, opto-mechanical setups, phononic modes in lattices, many body systems described using harmonic oscillator chains. In these systems, input modes in Gaussian states are sent into a reconfigurable linear interferometer, and a subset of output modes are measured, leaving the unmeasured output modes in a non-Gaussian state. In addition, the reconfigurability of the linear interferometer allows the optimization of the circuit setting, thereby increasing the fidelity and success probability of state preparation.

Before illustrating detailed methods of using the apparatus described herein (e.g., apparatus shown in FIGS. 1A-5) for generating non-Gaussian states from Gaussian states, it can be helpful to analyze the correlation between the non-Gaussian output and the setting of the optical circuit as well as the parameters of the input optical modes. The analysis can start with the case where (N−1) modes of an N-mode pure Gaussian state at the output are measured, resulting in a single-mode non-Gaussian state. For example, this can be achieved in the apparatus 300 shown in FIG. 3 by measuring (M−1) modes, leaving the last output as the non-Gaussian output. Generalizations of this analysis to multimode outputs or measuring mixed Gaussian states can be made.

In this analysis, an operator vector $\hat{\xi}^{(c)}$ is defined as $\hat{\xi}^{(c)}=(\hat{\alpha}^{\dagger}_1, \ldots, \hat{\alpha}^{\dagger}_N, \hat{\alpha}_1, \ldots, \hat{\alpha}_N)$, where $\hat{\alpha}^{\dagger}_k(\hat{\alpha}_k)$ are the creation (annihilation) operators of the k-th optical mode that satisfies the boson commutation relation $[\hat{\alpha}_j, \hat{\alpha}^{\dagger}_k]=\delta_{jk}$, the superscript "(c)" represents the coherent state basis. Without being bound by any particular theory or mode of operation, Gaussian states can be fully characterized by the mode operator's first and second moments, given explicitly as the displacement vector $Q^{(c)}=\langle \hat{\xi}^{(c)} \rangle$ and covariance matrix $V^{(c)}$:

$$V^{(c)}_{jk} = \frac{1}{2}\langle \{\hat{\xi}^{(c)}_j, \hat{\xi}^{(c)\dagger}_k\} \rangle - \langle \hat{\xi}^{(c)}_j \rangle\langle \hat{\xi}^{(c)\dagger}_k \rangle \qquad (1)$$

Without loss of generality, it can be assumed that the last (N−1) modes are measured onto the Fock state $|\bar{n}\rangle = |n_2, n_3, \ldots n_N\rangle$, where $n_k$ is the photon number registered at the k-th detector. The un-normalized output density matrix of the first mode (i.e., the non-Gaussian output) is $\tilde{\rho}_1=\langle \bar{n}|\rho|\bar{n}\rangle$ with a success probability $P(\bar{n})=\text{Tr}(\tilde{\rho}_1)$, where $\rho$ is the density matrix of the N-mode Gaussian state. The Wigner function of $\tilde{\rho}_1$ can be written as:

$$W(\alpha; \tilde{\rho}_1) \propto \exp\{-(\alpha^{\dagger} - d^{\dagger})(SS^{\dagger})^{-1}(\alpha - d)\} \times \prod_{k=2}^{N}\left(\frac{\partial^2}{\partial \alpha_k \partial \beta^*_k}\right)^{n_k} \exp\left(\frac{1}{2}\gamma_d^T A\gamma_d + z^T\gamma_d\right)\bigg|_{\gamma_d=0} \qquad (2)$$

where $\gamma_d=(\beta^*_2, \beta^*_3, \ldots, \beta^*_N, \alpha_2, \alpha_3, \ldots, \alpha_N)^T$, $(\beta_2, \ldots, \beta_N)$ and $(\alpha_2, \ldots, \alpha_N)$ correspond to the complex phase space variables of the measured modes, $\alpha=(\alpha^*, \alpha)^T$ is the complex phase space variable for the output state, d is the output displacement, and S is a symplectic transformation matrix. Both d and S can be fully determined by the input Gaussian state that is being measured. A is the matrix representing the linear transformation performed by the optical circuit on the input optical modes.

Equation (2) shows that the output state depends on $V^{(c)}$ and $Q^{(c)}$ of the initial measured Gaussian state, along with the measurement pattern of the (N−1) output modes. The relation between S, d, A, z and $V^{(c)}$, $Q^{(c)}$ can be developed as follows. Based on the covariance matrix $V^{(c)}$ and displacement $Q^{(c)}$, a matrix $\tilde{R}$ and a vector $\tilde{y}$ can be defined as:

$$\tilde{R}=X_{2N}(2V^{(c)}-I_{2N})(2V^{(c)}+I_{2N})^{-1}, \ \tilde{y}=2X_{2N}(2V^{(c)}+I_{2N})^{-1}Q^{(c)}, \quad (3)$$

where $I_{2N}$ is a 2N×2N identity matrix and $X_{2N}=X_2 \otimes I_N$, with $$X_2 = \begin{pmatrix} 0 & 1 \\ 1 & 0 \end{pmatrix}.$$

When the input Gaussian state is pure, it can be shown that $\tilde{R}=B \oplus B^*$, where B is an N×N symmetric matrix (with entries $b_{ij}$) given by $B=U \oplus^{N}_{j=1} \tanh(r_j) U^T$, $r_j$ is the squeezing parameter of the input squeezed states, and U is the unitary matrix representing the linear interferometer (e.g., in the optical circuit). The phases of the initial squeezed states can be absorbed into the interferometer.

A permutation matrix P, which moves the (N+1)-th component of $\tilde{y}$ to the second component, can be used to define a new vector $y=P\tilde{y}$ and a new matrix $R=P\tilde{R}P$. It is then easy to divide the heralded part (denoted d) and detected part in R and y as:

$$R = \begin{pmatrix} R_{hh} & R_{hd} \\ R_{dh} & R_{dd} \end{pmatrix}$$

and $y=(y_h, y_d)^T$, respectively. Now S, d, A, z can be written as:

$$S = \frac{I_2 + X_2 R_{hh}}{\sqrt{1-|b_{11}|^2}}, \quad (4)$$

$$d = (I_2 - X_2 R_{hh})^{-1} X_2 y_h,$$

$$A = R_{dd} - R_{dh}(I_2 + X_2 R_{hh})^{-1} X_2 R_{hd},$$

$$z = Y + \frac{2}{\sqrt{1-|b_{11}|^2}} R_{dh} S^{-1}(\alpha - d),$$

where $Y=y_d+R_{dh}(I_2-X_2R_{hh})^{-1}X_2y_h$ and S is a complex 2×2 symplectic matrix.

The Wigner function in Equation (2) can be factorized into two parts: a Gaussian function followed by a polynomial in α. Accordingly, the output state can be written as:

$$|\psi_1\rangle = \hat{D}(\beta)\hat{S}(\zeta) \sum_{n=0}^{n_{max}} c_n |n\rangle, \quad (5)$$

The expression in Equation (5) is a displaced and squeezed superposition of Fock states. The squeezing amplitude $\zeta$ can be determined by $b_{11}$ in the matrix B in equation (4) as: $|\zeta|=\frac{1}{2} \times \ln[(1+b_{11})/(1-b_{11})]$ and $\arg(\zeta)=-\arg(b_{11})/2$. The displacement β is determined by $d=(\beta^*, \beta)^T$. The non-Gaussian part of $\psi_1$ results only from the superposition of Fock states.

The maximum Fock number $n_{max}$ satisfies $n_{max} \le n_T$, where $n_T=n_2+n_3+ \ldots +n_N$ is the total number of detected photons. The inequality is saturated when $b_{1j} \ne 0$ for j from 2 to N, which implies that the maximally supported non-Gaussian state can be obtained when the unmeasured mode is fully connected with all other modes. The coefficients $\{c_n\}$ of Equation (5) can be determined by:

$$c_m c_n^* \propto \prod_{k=2}^{N} \left( \frac{\partial^2}{\partial \alpha_k \partial \beta_k^*} \right)^{n_k} \left[ \exp\left( \frac{1}{2} \gamma_d^T C \gamma_d + Y^T \gamma_d \right) \times \left( \sum_{i=2}^{N} k_j^* \alpha_j \right)^m \left( \sum_{i=2}^{N} k_i \beta_i^* \right)^n \right]_{\gamma_d=0}, \quad (6)$$

where $C=A+R_{dh}X_2R_{hd}/(1-|b_{11}|^2)$, and $\kappa_j=b_{1j}/\sqrt{1-|1-b_{11}|^2}$ for $j \ge 2$. Although Equation (6) gives the product of two coefficients, it is easy to find $c_n/c_{nmax}$ from Equation (6) and use the normalization condition to obtain a unique output state.

The measurement probability for a given photon pattern $\bar{n}$, can be computed as $P(\bar{n})=\langle\bar{n}|\text{Tr}_h(\rho)|\bar{n}\rangle$, and one obtains:

$$P(\bar{n}) = \frac{\mathcal{P}_0}{\bar{n}!}[\det(I_2 - X_2 R_{hh})]^{-1/2} \exp\left(\frac{1}{2} y_h^T d\right) \times \prod_{k=2}^{N} \left( \frac{\partial^2}{\partial \alpha_k \partial \beta_k^*} \right)^{n_k} \exp\left(\frac{1}{2} \gamma_d^T A_p \gamma_d + z_p^T \gamma_d\right)\bigg|_{\gamma_d=0}, \quad (7)$$

$$\mathcal{P}_0 = 2^N [\det(2V^{(c)} + I_{2N})]^{-1/2} \exp\left(-\frac{1}{2} Q^{(c)T} \tilde{y}\right), \quad (8)$$

$$A_p = R_{dd} + R_{dh}(I_2 - X_2 R_{hh})^{-1} X_2 R_{hd},$$

$$z_p = y_d + R_{dh}d, \ \bar{n}! = n_2! n_3! \cdots n_N!.$$

It is helpful to investigate how many of the coefficients $\{c_n\}$ in Equation (6) are independent because this can determine what non-Gaussian states can be prepared and also characterizes the extent of non-Gaussianity generated by a PNR measurement on a multimode Gaussian state. In Equation (6), when $b_{1j} \ne 0$ for all j from 2 to N, the maximal Fock number $n_{max}$ is equal to the total number of detected photons $n_T$. In principle, there are no restrictions on $n_T$ but the number of independent $\{c_n\}$ is limited because there is a finite number of complex parameters N(2N+3)/2 resulting from the covariance and mean of the pure Gaussian state. The number of independent $\{c_n\}$ is smaller than the number of independent complex parameters in the Gaussian state being measured, i.e., N(2N+3)/2, and the redundant degrees of freedom allow the search for the optimal Gaussian state that maximizes the success probability of the output state.

It can be assumed that $b_{1j} \ne 0$ (or $\kappa_j \ne 0$) for all j from 2 to N. By defining an (N−1)-component vector μ as $\mu_j=Y_j/\kappa_j^*$ and a symmetric matrix F with entries $f_{ij}=b^*_{11}+b_{ij}/(\kappa_i \kappa_j)$, where i, j=2, 3, . . . , N, the ratio $c_n/c_{n_T}$ can now be written as:

$$\frac{c_n}{c_{n_T}} = \prod_{k=2}^{N}\left(\frac{\partial^2}{\partial\omega_k \partial\sigma_k^*}\right)^{n_k} \exp(Z) \frac{\mathcal{W}^n \sum^{n_f}}{\sqrt{n!(n_T!)^3}}\bigg|_{\omega=\sigma=0}, \quad (9)$$

$$Z = \frac{1}{2}(\sigma^*, \omega)^T C_{rn}\begin{pmatrix}\sigma^*\\ \omega\end{pmatrix} + (\mu^*, \mu)^T\begin{pmatrix}\sigma^*\\ \omega\end{pmatrix},$$

$$\mathcal{W} = \sum_{j=2}^{N} \omega_j, \quad \sum = \sum_{i=2}^{N} \sigma_i^*, \quad C_{rn} = F \oplus F^*.$$

Therefore, the ratio $c_n/c_{n_T}$ can be uniquely determined by the vector $\mu$ and the matrix F. Performing the partial derivatives in Equation (9) results in a polynomial of $\mu_j$ and $f_{ij}$. The total number of independent complex parameters including the components of $\mu$ and the entries of F (being symmetric) is $\mathfrak{H}=(N+2)(N-1)/2$.

The procedure of determining the number of independent $\{c_n\}$ can be formulated as follows. Suppose that $\mu_j$ and $f_{ij}$ are unknown and are solved from $n_T$ nonlinear polynomial equations which come from Equation (9) by taking n=0, 1, . . . , $n_T-1$. If $n_T < \mathfrak{H}$, the nonlinear equations are underdetermined, which means that for a given set of $\{c_n\}$ there is an infinite number of solutions. This implies that there are many Gaussian states that can generate the same non-Gaussian state. If $n_T > \mathfrak{H}$, the nonlinear equations are overdetermined and there is no guarantee for the existence of solutions for an arbitrary given set $\{c_n\}$, which means they are not independent.

In the case of $n_T = \mathfrak{H}$, if there exist solutions, the number of solutions is finite. It is also possible that there exist no solutions. This observation can be verified for the N=2, 3 cases via stochastic numerical simulations. The simulation result is that when $n_T = \mathfrak{H}$, finite number of solutions exist. Accordingly, measuring (N−1) modes of an N-mode pure Gaussian state using PNR detectors can generate a coherent superposition of Fock states with at most (N+2)(N−1)/2 independent coefficients. Equation (9) also provides a systematic way to generate target non-Gaussian states. If the target state can be written in the form of Equation (5), then it can be generated with fidelity of one. In other cases, the target state can be approximated in the form of Equation (5). A sufficiently high fidelity can be obtained using an $n_{max}$ that is sufficiently large. In other words, increasing $n_{max}$ can increase the fidelity of the non-Gaussian output state with respect to the given target state.

Based on the above analysis, the procedure to prepare a target non-Gaussian state can include one or more of the following steps. The target non-Gaussian state can be approximated using Equation (5) to determine the values of $\zeta$, $\beta$, and $c_n$. Then the nonlinear equations obtained from Equation (9) can be solved to obtain parameters of input Gaussian states that can give rise to the output state with coefficients $\{c_n\}$. In some embodiments, Equation (9) can have more than one solution, and one can use this freedom to find the input states that give rise to the highest success probability. The success probability can be optimized by finding the proper matrix R and vector y. The procedure can also include computing the covariance matrix $V^{(c)}$ and the displacement vector $Q^{(c)}$ of the measured Gaussian state.

Figure 7:
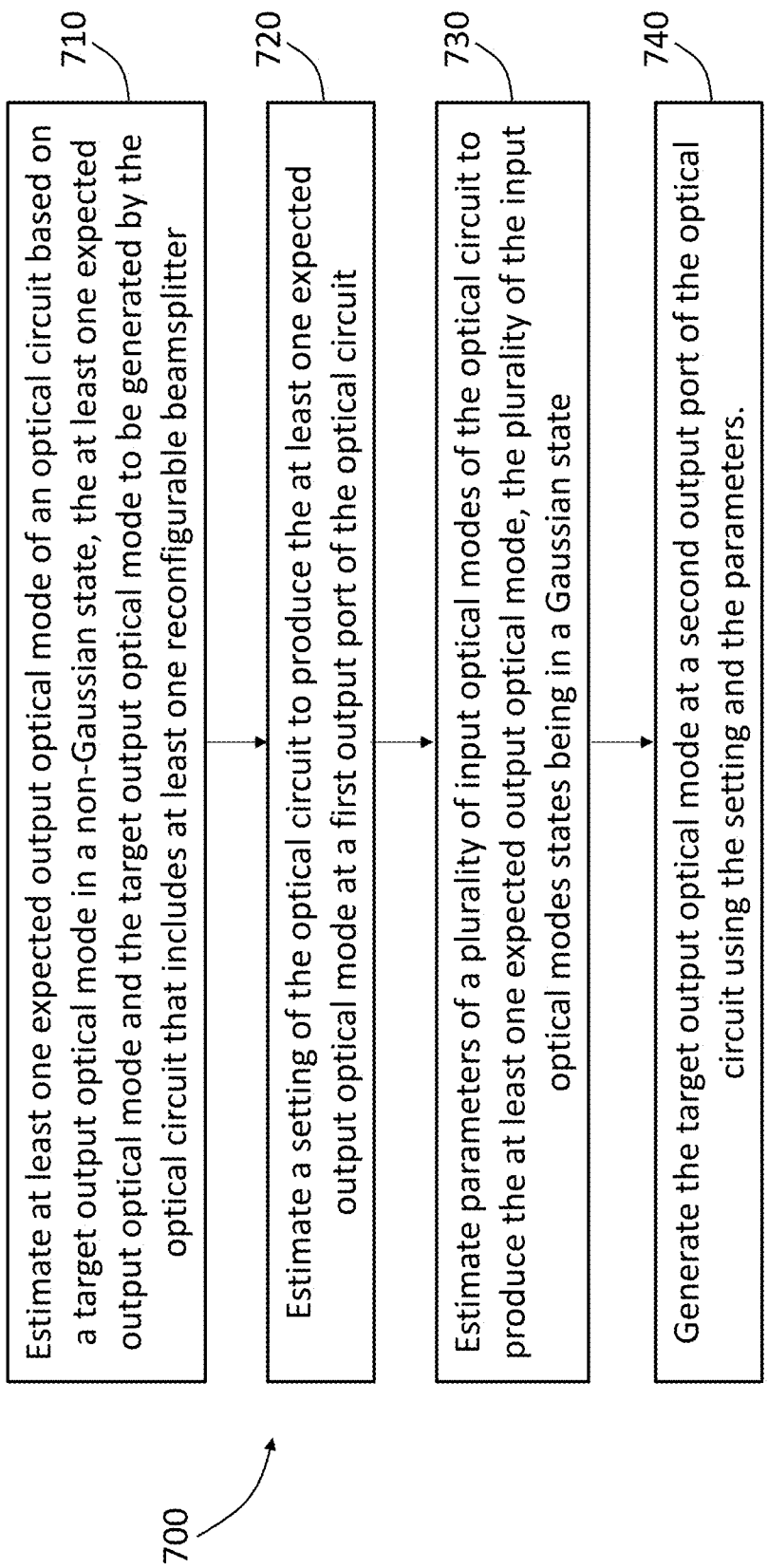
FIG. 7 is a flowchart illustrating a method of generating non-Gaussian states from Gaussian states, according to an embodiment.

FIG. 7 is a flowchart illustrating a method 700 of generating non-Gaussian states from Gaussian states, according to an embodiment. The method 700 includes, at 710, estimating at least one expected output optical mode of an optical circuit based on a target output optical mode in a non-Gaussian state. The expected output optical mode and the target output optical mode are to be generated by the optical circuit that includes at least one reconfigurable beamsplitter. The method 700 also includes, at 720, estimating a setting of the optical circuit to produce the at least one expected output optical mode at a first output port of the optical circuit. The method 700 also includes, at 730, estimating parameters of a plurality of input optical modes of the optical circuit to produce the expected output optical mode. The plurality of the input optical modes are in Gaussian states and can be characterized by their squeezing factors and displacements. Based on the estimated settings of the optical circuit and the parameters of the input optical modes, the target output optical mode is then generated at a second output port of the optical circuit (different from the output port where the expected output optical mode is generated and measured) at 740.

In some embodiments, estimating the at least one expected output optical mode includes estimating an expected photon number in the at least one expected output optical mode. In some embodiments, the at least one expected output optical mode includes multiple expected output optical modes, and the estimation includes estimating the photon number in each expected output optical mode.

In some embodiments, estimating the setting of the optical circuit includes calculating a plurality of candidate settings based on maximizing a fidelity of the optical circuit in generating the target output optical mode. In other words, the plurality of candidate settings are estimated by optimizing the fidelity of the non-Gaussian state preparation. Based on the candidate settings, the final settings of the optical circuit can be determined by maximizing a success probability for the optical circuit to generate the target output optical mode. In some embodiments, the settings of the optical circuit can be estimated via machine learning techniques (see more details below). In some embodiments, estimating the parameters of the plurality of the input optical modes includes estimating a squeezing factor and a displacement of the plurality of input optical modes.

In some embodiments, generating the target output optical mode includes measuring a number of photons in the at least one expected output optical mode at the first output port of the optical circuit. In some embodiments, the at least one expected output optical mode includes multiple expected output optical modes, each of which can be sent out via a corresponding output port, and the measurement is performed on each expected output optical mode.

The method 700 can be used to generate various types of non-Gaussian states, such as a Schrödinger's cat state, a Gottesman-Kitaev-Preskill (GKP) state, a weak cubic phase state, an M-mode W state, and a NOON state, among others. As described herein, the method 700 can generate these types of non-Gaussian states at improved success probability compared with known techniques, such as photon subtraction. For example, the method 700 can be used to generate the target output optical mode in a Schrödinger's cat state at a success probability of about 10% or more. In another example, the method 700 can be used to generate the target output optical mode in a Gottesman-Kitaev-Preskill (GKP) state at a success probability of about 1% or more.

In some embodiments, the method 700 uses a reconfigurable optical circuit to generate the non-Gaussian state. In these embodiments, the method 700 can further include changing the settings of the optical circuit and the parameters of the plurality of input optical modes of the optical circuit to generate a different target output optical mode in a different non-Gaussian state. Such flexibility allows a user to generate different types of non-Gaussian states using the same apparatus. In addition, the reconfigurability of the optical circuit also allows a user to optimize the setting of the apparatus to improve the fidelity and/or the success probability of state preparation. Although shown and described with reference to FIG. 7 as using a reconfigurable optical circuit to generate a non-Gaussian state and a target output optical mode, in other embodiments a method of generating non-Gaussian states from Gaussian states includes using one or more fixed (i.e., not reconfigurable) optical circuits to generate a non-Gaussian state and a target output optical mode.

Figure 8:
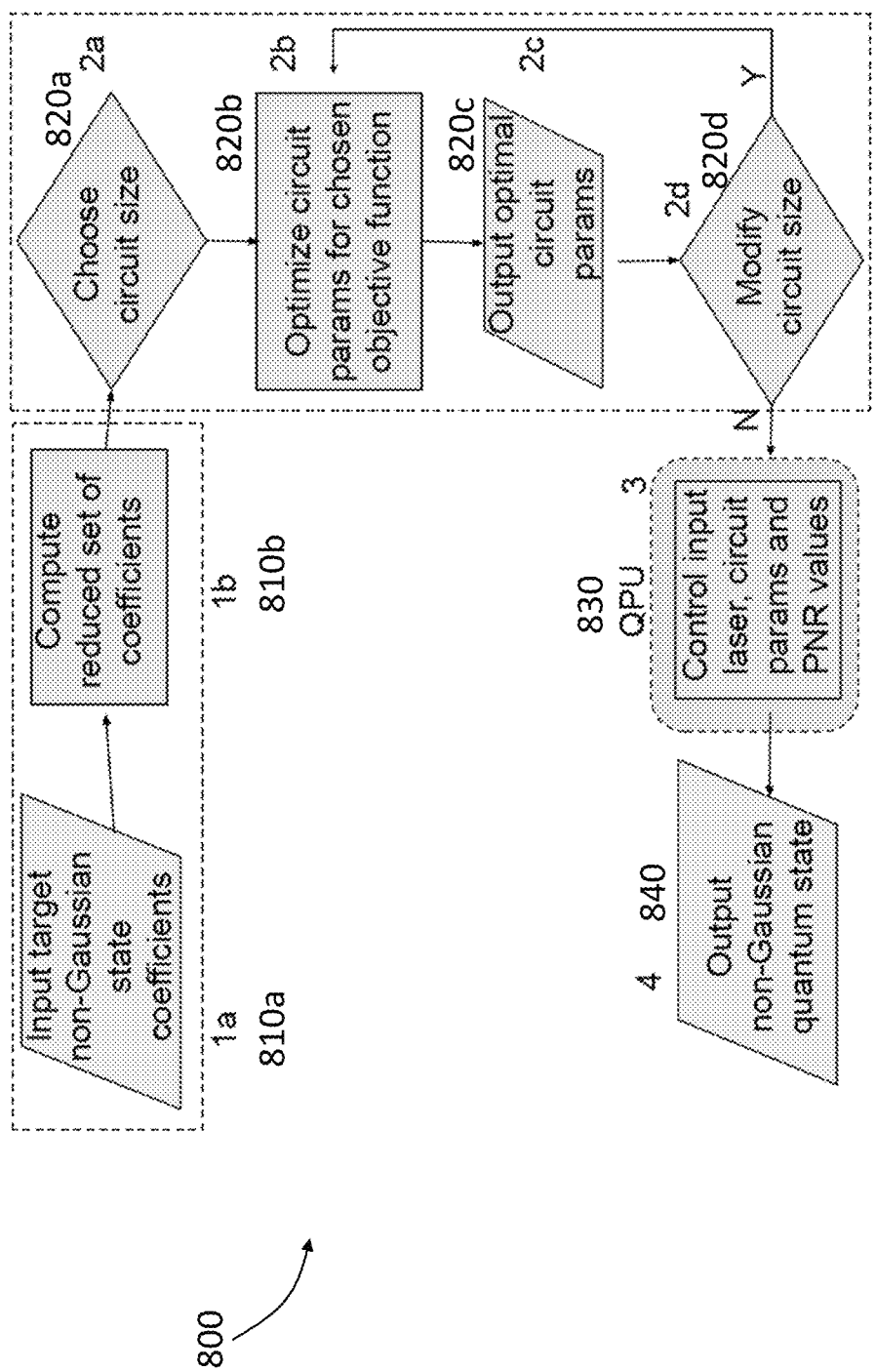
FIG. 8 is a flowchart illustrating a method of generating non-Gaussian states including optimization of optical circuit parameters, according to an embodiment.

FIG. 8 is a flowchart illustrating a method 800 of generating non-Gaussian states including optimization of optical circuit parameters, according to an embodiment. The method 800 includes, at 810a, receiving coefficients of a target non-Gaussian state (e.g., at a controller 160 shown in FIG. 1A) or signals representing these coefficients. The non-Gaussian state can be described in any appropriate basis, such as the Fock basis. In some embodiments, the controller can receive the coefficients from a user interface. At 810b, the target non-Gaussian state is expressed or approximated in a displaced squeezed Fock basis (e.g., in the form similar to Equation (5) above). This computation (e.g., also performed by the controller) generates a reduced set of coefficients to describe the target non-Gaussian state.

The method 800 also includes steps 820a to 820d to obtain the settings of the optical circuit that is used to generate the target non-Gaussian state. This calculation can be performed by a classical computer (e.g., the controller 160 in FIG. 1A). In some embodiments, this calculation can be performed using the machine learning technique described below.

At 820a, the size of the optical circuit is determined. For example, this estimation can determine that a two-mode circuit (e.g., similar to the apparatus 100 shown in FIG. 1A) is sufficient to generate the target non-Gaussian state. Alternatively, the estimation may determine that a three-mode circuit (e.g., similar to the apparatus 200 shown in FIG. 2) or a multimode circuit (e.g., similar to the apparatus 300 shown in FIG. 3) is more efficient. The size of the optical circuit can depend on, for example, the complexity of the non-Gaussian target state or the number of the reduced coefficients used to describe the target non-Gaussian state. Typically, a larger number of reduced coefficients leads to a higher order mode circuit.

At 820b, numerical optimization and/or machine learning can be used to determine the circuit settings (e.g., transmission ratio of each beamsplitter in the optical circuit or the amount of phase shift implemented by each phase shifter). This calculation is performed with a chosen objective function, including the fidelity to the target non-Gaussian state, the success probability of producing the target non-Gaussian state, other characteristics such as non-Gaussian measures, or a combination of these functions.

At 820c, the circuit setting estimated at 820b is implemented (via simulation) in the optical circuit chosen at 820a to examine the expected measurement pattern of a subset of the output optical modes from the optical circuit. The method 800 also includes an optional step 820d, where steps 820a to 820c are repeated if desired for an apparatus having a different number of working modes. This step can be part of an automated loop to optimize the number of modes. Alternatively, a user can be provided with (e.g., at a user interface) a selection table of target state properties versus the number of modes to facilitate the selection.

The method 800 also includes, at 830, implementing the circuit settings in a real optical circuit. The properties of the input optical modes (e.g., squeezing factor and/or displacement) can also be controlled so as to generate the target non-Gaussian state at 840. In some embodiments, the circuit settings and input parameters can be automatically implemented by the controller. In some embodiments, the circuit settings and input parameters can be implemented by a user via manual control. In some embodiments, the fidelity of the state generation process can be less than 1 (e.g., because the target non-Gaussian state is not exactly in the form of a superposition of states displaced squeezed Fock basis). In these embodiments, the generated non-Gaussian state is still an approximation of the target non-Gaussian state.

In some embodiments, the estimations performed at 820a to 820d can also take into account circuit imperfections (see, e.g., FIG. 4 and the associated descriptions). The imperfections can be addressed, at least partially, by adjusting the settings of the optical circuit.

In some embodiments, the estimation of the circuit setting (e.g., steps 720 and 730 in the method 700, or steps 820a-d in the method 800) can be performed using machine learning techniques in combination with a quantum simulator (e.g., the Strawberry Fields quantum simulator). For illustrative purposes only, the simulation here uses two-mode circuits (e.g., similar to apparatus 100 shown in FIG. 1A) and three-mode circuits (e.g., similar to apparatus 200 shown in FIG. 2). In practice, the simulation can be extended to devices having any other number of modes.

The machine learning technique can be configured to perform a two-step optimization. The first optimization is performed to maximize the fidelity with the target non-Gaussian state using a method called basinhopping, which is a global search heuristic. The second optimization includes a local search starting from the global optimum found by basinhopping to further increase the probability of producing the target non-Gaussian state.

The basinhopping method uses a stochastic approach that attempts to find the global minimum of a smooth scalar function and can be implemented in a simulation using the scipy software package. The basinhopping method is usually iterative with each cycle including the following steps. A cycle can start with initializing the variables $x_0$ and performing a local search to minimize $f(x, \text{args})$ starting from $x_0$. As used herein, $f$ is an objective function that is being optimized. For example, $f$ can be the fidelity, the success probability, or a combination of these or other functions. x corresponds to the parameters that are being optimized, such as the beamsplitter angles and phase, or input squeezing values. "args" usually corresponds to some fixed parameters, such as the Fock matrix elements of the target state, for example. In some embodiments, "args" corresponds to the state parameter $\alpha$ in a cubic phase state (see more details below).

The position where f reaches a local minimum is denoted as $x_{old}$. A tunable step size is then used to randomly change the position of $x_{old}$, followed by a local search again to minimize $f$ at a new location denoted as $x_{new}$. The cycle then proceeds to perform an acceptance test accept($x_{new}$, $x_{old}$). For example, if $f(x_{new}, \text{args}) < f(x_{old}, \text{args})$, $x_{old} = x_{new}$. In some embodiments, the acceptance test can be stochastic so as to maximize the likelihood of finding the global minimum. In the scipy implementation, the acceptance test includes the Metropolis criterion of standard Monte Carlo algorithms, where the probability of acceptance is given by $\exp[-(f(x_{old}, \text{args}) - x_{new}, \text{args}))/T]$ and T is a fictitious temperature to control the degree of randomness. The cycle then goes back to the local search for $x_{old}$ and repeats the process niter times.

This global minimization method can be extremely efficient for a wide variety of problems in physics and chemistry. For a stochastic global heuristic, it can be challenging to determine if the true global minimum has actually been found. In the simulation described herein, niter can be set at 40, which is tuned to be able to produce reproducible results. The tunable step size is set to be the default value from the scipy package. The method for local search can include many options, such as sequential least squares programming (SLSP) that tends to operate at high efficiency for estimating a circuit setting herein.

For the task of generating target non-Gaussian states, optimizing the fidelity can be combined with optimizing the success probability to facilitate the construction of a scalable architecture such that the resulting device can produce the target non-Gaussian states at a sufficiently high rate for practical uses. One approach to achieve both high fidelity and probability is to train the circuit to maximize fidelity and then use that point as a seed to further optimize the success probability (referred to as the second optimization). In some implementations, the second optimization can be performed using a brute-force optimization over the success probability. More specifically, the basinhopping method described above can be repeated for nbh times. The simulation then picks out the global optimum, trained to optimize fidelity with the highest probability. In some embodiments, the nbh can be set at 20 and niter set at 30 to obtain reproducible results.

More details of the optimization methods described herein and source codes can be found at https://github.com/XanaduAI/strawberryfields. In addition, the Python scripts for the optimization are built on Strawberry Fields and the scipy package, and they can be accessed at https://github.com/XanaduAI/constrained-quantumlearning. Further references can be found in, for example, Nathan Killoran, Josh Izaac, Nicolás Quesada, Ville Bergholm, Matthew Amy, and Christian Weedbrook. "Strawberry Fields: A Software Platform for Photonic Quantum Computing", *Quantum*, 3, 129 (2019), and Krishna Kumar Sabapathy, Haoyu Qi, Josh Izaac, Christian Weedbrook, Production of photonic universal quantum gates enhanced by machine learning, *Phys. Rev. A*, 100, 012326 (2019), each of which is incorporated herein in its entirety.

The machine learning and optimization techniques described herein are used to generate cubic phase states, which can be represented as $|\phi\rangle_\alpha = (1+5|\alpha|^2/2)^{-1/2}[|0\rangle + i\alpha\sqrt{3/2}|1\rangle + i\alpha|3\rangle]$, where $\alpha$ is a real number. The machine learning and optimization uses both two-mode and three-mode circuits. The PNR detectors in the two-mode case are set to m=2 (i.e., two photons are detected) and in the three-mode case to $(m_1, m_2)=(1, 2)$ (i.e., one photon is detected in the first detector and two photons are detected in the second detector).

Figures 9A, 9B, 9C:
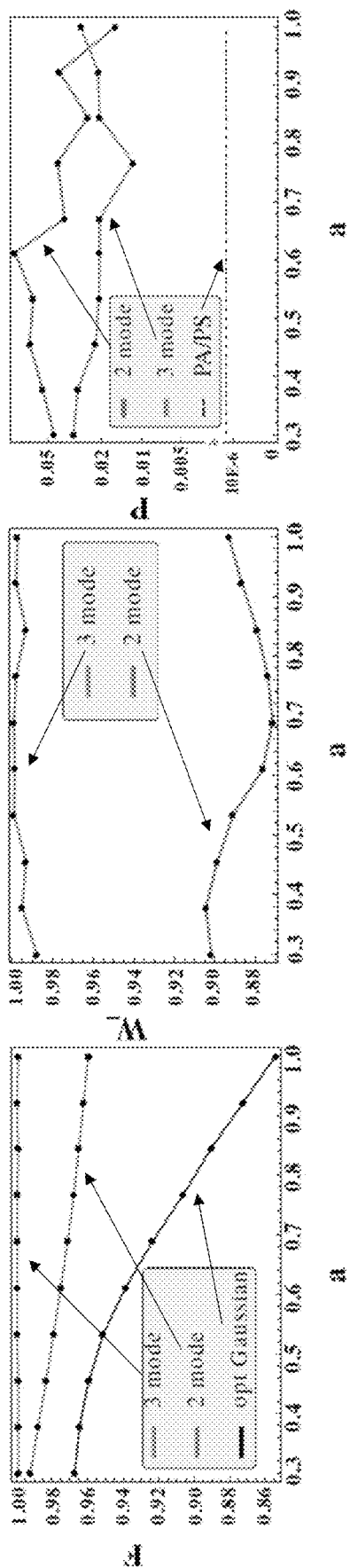
FIGS. 9A-9C show optimal fidelity F of a machine learned cubic phase state $|\phi_L\rangle$, the overlap of the negative region of the Wigner function W between $|\phi_L\rangle$ and a target cubic phase state $|\phi_L\rangle$, and the success probability of producing the optimal output state $|\phi_L\rangle$, respectively, according to an embodiment.

FIGS. 9A-9C show the optimal fidelity F of the machine learned state $|\phi_L\rangle$, the overlap of the negative region of the Wigner function W between $|\phi_L\rangle$ and the target state $|\phi_L\rangle$, and the success probability, respectively, as a function of the parameter a, according to an embodiment. FIG. 9A also shows the closest Gaussian state (bottom curve) with respect to the target state $|\phi_L\rangle$ for comparison. FIG. 9C also shows the success probability achieved by three consecutive photon additions/subtractions (labelled as "PA/PS"). The PA/PS has a success probability around $10^{-6}$, which is four orders of magnitude lower than the success probability achieved using the two-mode and three-mode circuits. For fidelity and Wigner negativity, the three-mode case also performs better albeit at the cost of a drop in probability.

Figures 10A, 10B, 10C:
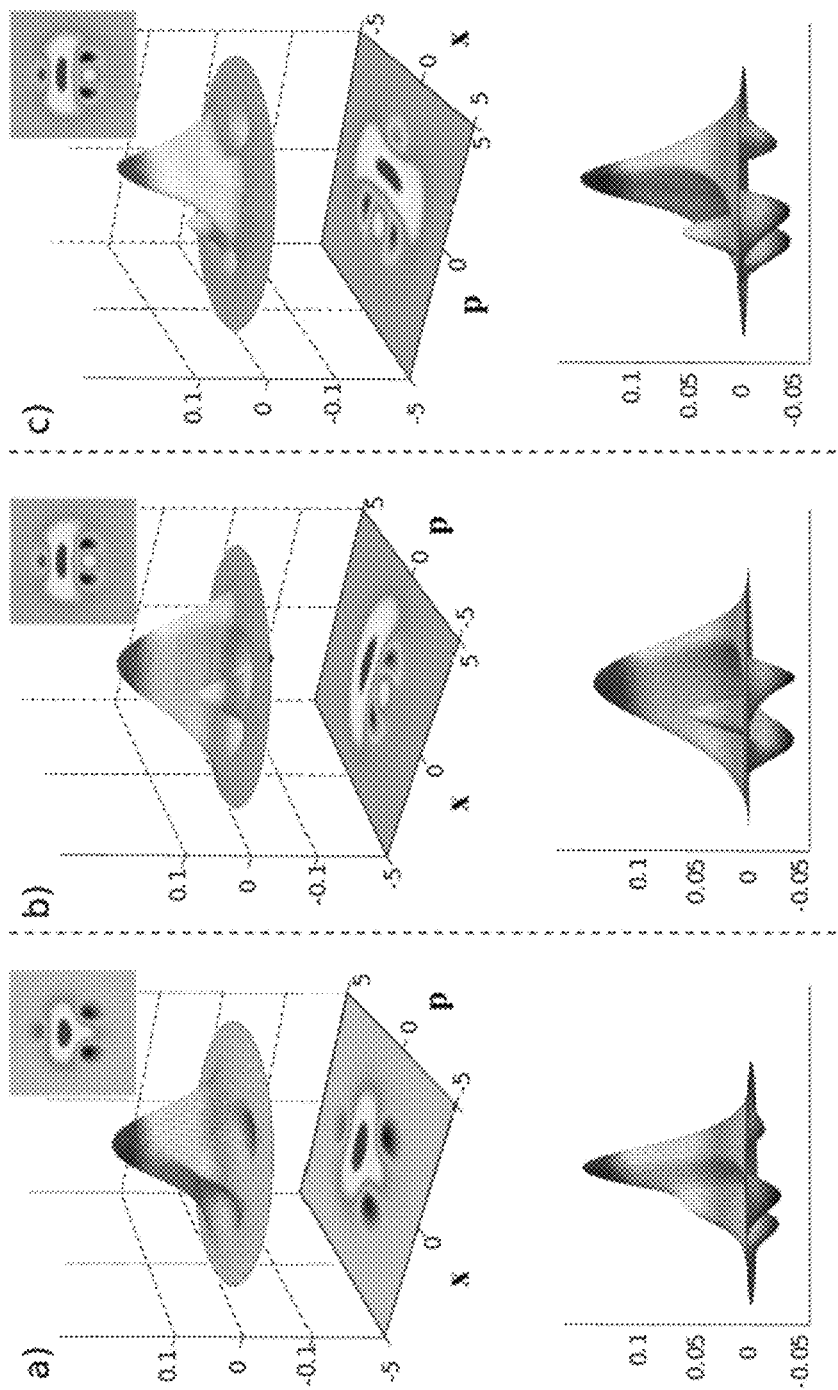
FIGS. 10A-10C show simulated Wigner functions of three machine learned cubic phase states, according to an embodiment.

FIGS. 10A-10C show the Wigner functions of the machine learned state $|\phi_L\rangle$ for a=0.3 with three-mode architecture (FIG. 10A), a=0.61 with two-mode circuit (FIG. 10B), and a=0.61 with the three-mode architecture (FIG. 10C). The insets are the Wigner contour plot for the target states for the corresponding values of a. The trained state using the three-mode circuit is almost indistinguishable with the target state. For the two-mode case with a=0.61 (FIG. 10B), one Wigner negative region is missing with respect to the three-mode case shown in FIG. 10C, thereby leading to lesser fidelity to the target state.

In these simulations, the parameter a is between 0.3 and 1, and the gate strength $\gamma$ is between 0.0122 and 0.0407 (see, e.g., FIG. 19 below). The trained and target states are both pure, and the fidelity is equivalent to the Wigner overlap, i.e., $F(\phi_L,\phi)=|\langle\phi_L|\phi\rangle|^2=\int dxdp W(x, p; \phi_L)W(x, p; \phi))$. Therefore, a high fidelity also implies a high Wigner overlap as illustrated in FIGS. 10A-10C. The simulation results show that using the three-mode architecture can generate an output that is extremely close to the target state.

Figures 11A, 11B:
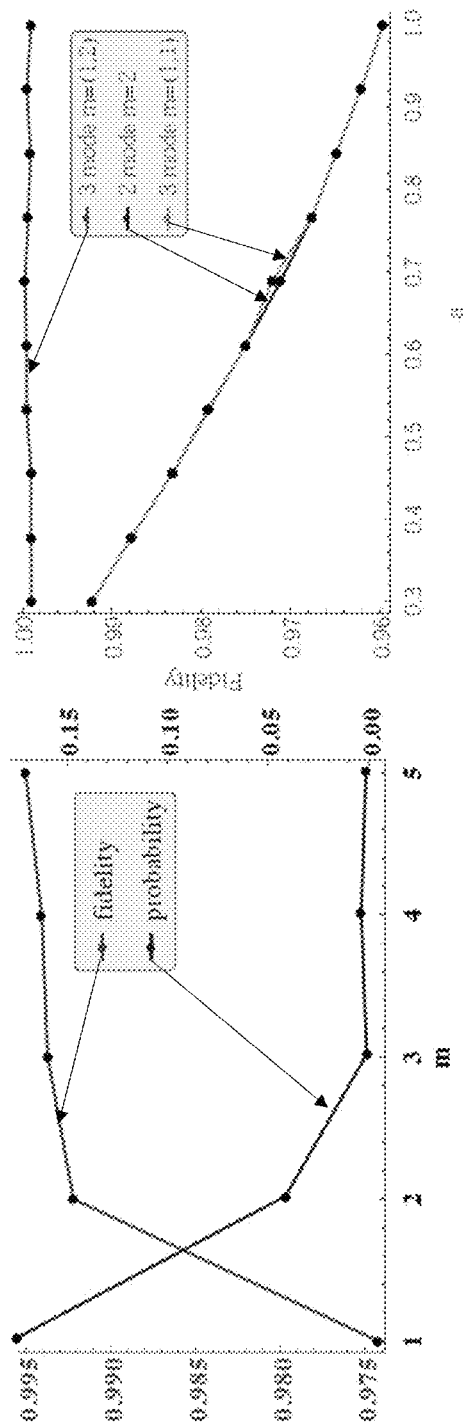
FIG. 11A shows calculated fidelity of a trained cubic phase state to a target cubic phase state and the probability of preparing the trained state in a two-mode circuit, according to an embodiment.
FIG. 11B shows calculated fidelity of a trained cubic phase state for different measurement patterns in a three-mode circuit, according to an embodiment.

FIG. 11A shows the calculated fidelity of the trained state to the target state and the probability of preparing the trained state as a function of post-selection m of the PNR detectors in the two-mode circuit, according to an embodiment. The simulation uses basinhopping with niter=20 without further optimizing the probability. FIG. 11A shows that the choice of m=2 has a reasonable trade-off between fidelity and probability.

FIG. 11B shows calculated optimal fidelities for m=(1, 1) and for m=(1, 2) for the output state of the three-mode circuit, bench-marked against a two-mode circuit with measurement m=2, for various values of the target state parameter $\alpha$, according to an embodiment. The measurement m=(1, 1) has a less optimal performance compared to using m=(1, 2). For the three-mode case with m=(1, 2) and m=(1, 1), niter is set at 40 and 80 respectively. FIG. 11B shows that a near-perfect fidelity is achieved in the three mode circuit for all values of $\alpha$-[0.3, 1] when the PNR detectors are post-selected to values $(m_1, m_2)=(1, 2)$. In addition, the performance of the two-mode architecture with m=2 is extremely close to the three-mode circuit with $(m_1, m_2)=(1, 1)$. In both cases a common feature is that the sum of the values of post-selected PNR detectors are the same.

FIG. 12 is a table listing the optimal circuit parameters for the two-mode architecture with PNR m=2, according to an embodiment. $\{r_i, \phi_i^r\}(d_i,\phi_i^d)$ are the magnitude and phase for squeezing (displacement) applied to the i-th vacuum mode. $(\theta, \psi)$ are the parameters for the beamsplitter. These parameters are used to achieve the fidelity of the trained state to the target state and the success probability of production presented in FIGS. 9A-9C. The squeezing values $r_1, r_2$ are all equal to or less than about 5.1 dB.

FIG. 13 is a table listing circuit parameters of a three-mode circuit achieved from machine learning, according to an embodiment. The measurement pattern is $(m_1=1, m_2=2)$. $\{r_i, \phi^r_i\}$ are the magnitude and phase for squeezing applied to the i-th vacuum mode. $d_i$ are the displacements applied to the i-th vacuum mode. Taking the displacements to be real gives rise to more stable solutions. $(\theta_i, \phi_i)$ are the parameters for the beamsplitters. The parameters in FIG. 13 are also used to achieve the fidelity of the trained state to the target state and the success probability of production presented in FIGS. 9A-9C. The squeezing values $r_1, r_2$ are all equal to or less than about 6.7 dB. Further, unlike the two-mode case earlier, it turns out that taking the displacements to be real provided better fidelity results.

Figure 14:
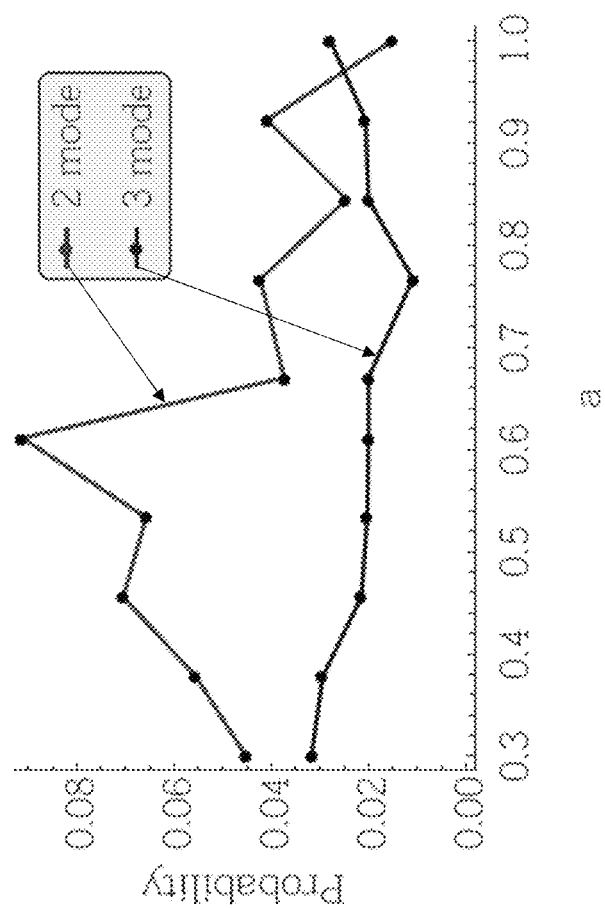
FIG. 14 shows simulated success probability of preparing a cubic phase state using two-mode and three-mode architectures, according to an embodiment.

FIG. 14 shows simulated probability of preparing the trained states using the two-mode and three-mode architectures for various values of target state parameter α, according to an embodiment. The simulation is performed with niter=40 in the first optimization and (niter=30, nbh=20) in the second optimization. For most cases the success probability of the two-mode case is higher than the success probability achieved by the three-mode case (at the cost in the fidelity as described above).

Figure 15:
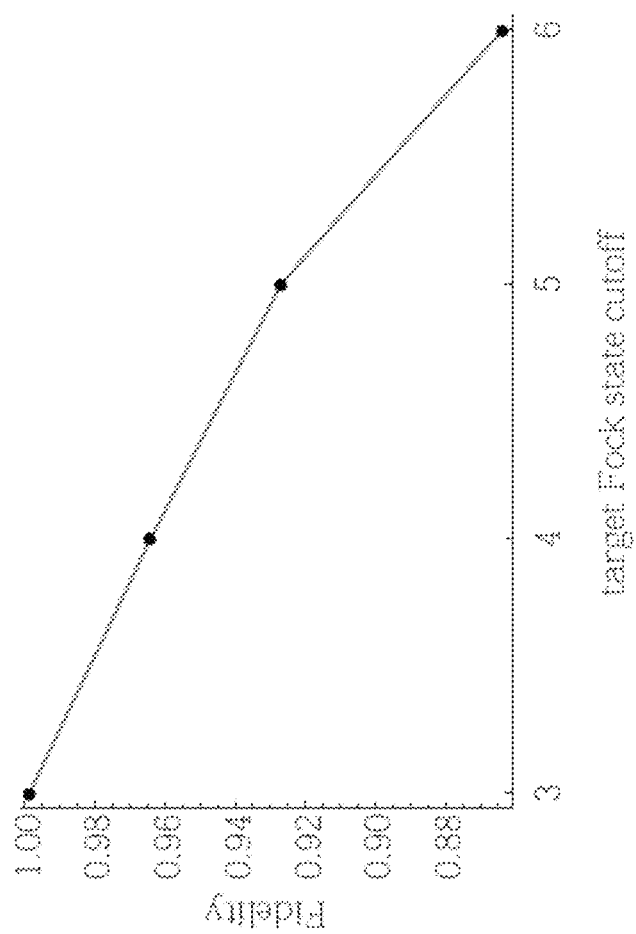
FIG. 15 shows the average fidelity of a trained state to a target random state for various values of the Fock cutoff dimension, according to an embodiment.

FIG. 15 shows the average fidelity of the trained state to a target random state for various values of the Fock cutoff dimension. Here, the Fock cutoff dimension is one less than the physical cutoff dimension. The simulation sampled 100 random states for each value of target cutoff dimension. The simulation tries to target a random state for each value of Fock state cutoff as outputs of the three-mode architecture with the same post-selected PNR detectors $(m_1, m_2)=(1, 2)$. FIG. 15 shows that the average fidelity is monotonically decreasing with an increase in the Fock output cutoff dimension of the target state.

Apparatus and methods described herein can be used to generate various types of non-Gaussian states, such as the Schrödinger's cat state, the Gottesman-Kitaev-Preskill (GKP) state, the weak cubic phase state, the M-mode W state, and the NOON state, among others. A Schrödinger's state $|cat_{e/o}\rangle$ (also referred to as a cat state) can be treated as a superposition of two coherent states with opposite phases, i.e., $|cat_{e/o}\rangle = |\alpha\rangle \pm |-\alpha\rangle$, where e/o denotes even or odd states. Bosonic codes based on Schrödinger's cat states allow for fault-tolerant quantum computing.

Without loss of generality, an even cat state, which is a superposition of only even Fock states, is used here for illustrative purposes. The even cat state can be well approximated by $c_0|0\rangle + c_2|2\rangle$ for small α and by $\hat{S}(\zeta_1)(c_0|0\rangle + c_2|2\rangle)$ when α is large (see FIG. 16 below), where $\hat{S}(\zeta_1)$ is a squeezing operator with parameter $\zeta_1$. It is evident that $\hat{S}(\zeta_1)(c_0|0\rangle + c_2|2\rangle)$ is in the form of Equation (5) and therefor can be generated by detecting a pure two-mode Gaussian state using a PNRD and post selecting the measurement outcome with two photons.

FIG. 16 is a table listing parameters that are used for generating an even cat state by detecting a two-mode Gaussian state with a PNRD, according to an embodiment. The even cat state is approximated by $\hat{S}(\zeta_1)(c_0|0\rangle + c_2|2\rangle)$. $\mathcal{F}_{max}$ is the maximum fidelity, $P_{max}$ is the maximum success probability, $\zeta_{01}$ and $\zeta_{02}$ are the squeezing parameters of input squeezed vacuum states, and θ is the parameter of the beamsplitter defined as $\exp[\theta(\hat{\alpha}_1\hat{\alpha}_2^\dagger - \hat{\alpha}_1^\dagger\hat{\alpha}_2)]$. FIG. 16 shows that a high fidelity (e.g., greater than 97%) and a high success probability (e.g., greater than 10%) can be achieved for α equal to less than 2. The corresponding input squeezing is $\zeta_{01} \in (1.1587, 1.6150)$, i.e., about 10 dB to about 14 dB. This squeezing range is within current technology since 15 dB squeezing has been demonstrated experimentally. In addition, the de-coherence process can be substantially slowed down for squeezed cat states, which can be generated using only offline squeezing in the approach described herein.

The Gottesman-Kitaev-Preskill (GKP) code can be used to encode qubits in qumodes to protect against shifts or errors in the quadratures and photon loss. But it has been a challenging task to generate the optical GKP codes. The approach described herein can be used to conditionally generate an approximate GKP state $\psi_{GKP}(q; \Delta)$ that can be written as:

$$\psi_{GKP}(q; \Delta) = k_0 \sum_{s=-\infty}^{+\infty} \exp[-2\pi\Delta^2 s^2 - (q - 2\sqrt{\pi}s)^2/(2\Delta^2)]$$

, where $k_0 = N_0(\pi\Delta^2)^{-1/4}$, Δ is standard deviation and $N_0$ is the normalization.

The GKP state can be approximated as $\hat{S}(\zeta_1)(c_0|0\rangle + c_2|2\rangle + c_4|4\rangle)$, where Δ=0.35, corresponding to 9.12 dB of squeezing. A fidelity 81.8% can be obtained with the following parameters: $\zeta=0.294$, $c_0=0.669$, $c_2=-0.216$, $c_4=0.711$. The approximated GKP state is generated by measuring two modes of a three-mode Gaussian state and post selecting the photon number pattern $\bar{n}=(2, 2)$. In other words, the apparatus 200 shown in FIG. 2 can be used here to generate the approximated GKP state when the first detector 230a detects two photons and the second detector 230b also detects two photons. The best success probability is about 1.1%.

A weak cubic phase state $|\phi\rangle_\alpha$ can be represented as: $|\phi\rangle_\alpha = (1+5|\alpha|^2/2)^{-1/2}[|0\rangle + i\alpha\sqrt{3/2}|1\rangle + i\alpha|3\rangle]$, for a real α. Such states can be combined in a gate teleportation scheme to implement weak cubic phase gates on input states (see, e.g., FIG. 19 below). More details of generating cubic phase states from Gaussian states are described above (e.g., with reference to FIGS. 9A-14).

Figure 17:
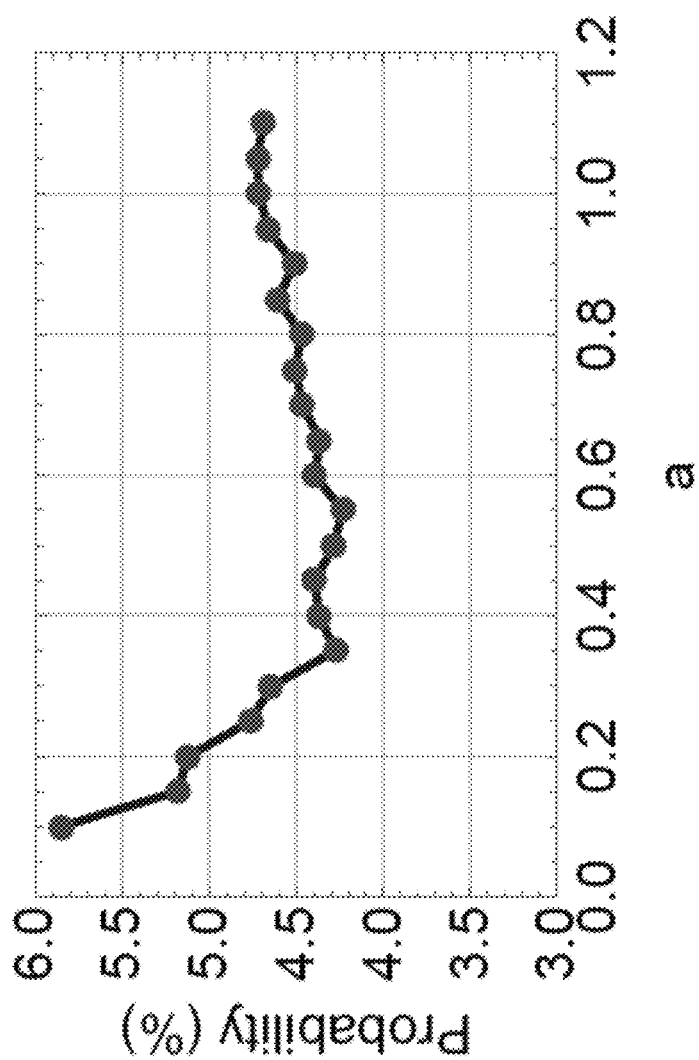
FIG. 17 shows the success probability of generating cubic phase states with perfect fidelity, according to an embodiment.

FIG. 17 shows the success probability of generating cubic phase states with fidelity of one, according to an embodiment. A three mode circuit (e.g., similar to the apparatus 200 shown in FIG. 2) is used and the state is conditioned on detecting one photon and two photons at the second and third modes, respectively. The success probability is in the range of about 4% to about 6%, which is a significant improvement over known techniques.

The approach described herein can be extended to generate multimode output states and the structure of the output states is similar to Equation (2). The procedure to find a target multimode non-Gaussian state is also similar to that of the single-mode non-Gaussian state. In some implementations, apparatus and methods described herein can be used to generate the M-mode W state (denoted by $W_M$). The $W_M$ state is an equal superposition of $|1_k\rangle$ for all possible k, where $|1_k\rangle$ is defined as the state with one photon in the k-th mode and zero photons in other modes. A $W_M$ state can be generated by measuring one mode of an (M+1)-mode Gaussian state and post selecting the measurement outcome with one photon. In some embodiments, in the apparatus 300 shown in FIG. 3, one detector can be used to measure one output optical mode from the optical circuit 320, leaving the other (M−1) modes to form a (M−1)-mode W state $W_{M-1}$ when the detected photon number is one. The $W_{M-1}$ state can be generated with fidelity of 1 and maximum success probability of 25%, which is independent of M.

In some embodiments, apparatus and methods described herein can be used to generate the NOON states. A NOON state is defined as $(|N0\rangle + |0N\rangle)/\sqrt{2}$ with N being a positive integer. FIG. 18 is a table listing fidelity and success probability achieved in generating NOON states from Gaussian states using the approach described herein, according to an embodiment. NOON states with N=2, 3, 4 are generated with perfect fidelity (i.e., Fid.=1). The success probability (labelled as Prob. in FIG. 18) is 0.55% for N=4 to 6.25% for N=2. (T, D) denotes the total number of input modes and the number of detected modes. For example, to generate a NOON state with N=2, four input modes are used and two detectors are used to detect two output optical modes, leaving the other two output optical modes forming the NOON state. For a NOON state with N=3, five input modes are used and three detectors are used to detect three output optical modes, leaving the other two modes forming the NOON state.

The table in FIG. 18 also summarizes the fidelity and success probability in generating other non-Gaussian states. For example, to generate the cat state, two input modes are used and one of the output modes is detected, leaving the other state in the cat state. The fidelity is close to 1 and the success probability is between about 10% to about 20%. To generate the GKP state, three input modes are used and two of the output modes are detected, leaving the third output mode as the GKP state. The fidelity can be about 0.818 and the success probability is around 1.1%. For cubic phase states, the fidelity is one and the success probability is about 4% to 6% as described above.

Figure 19:
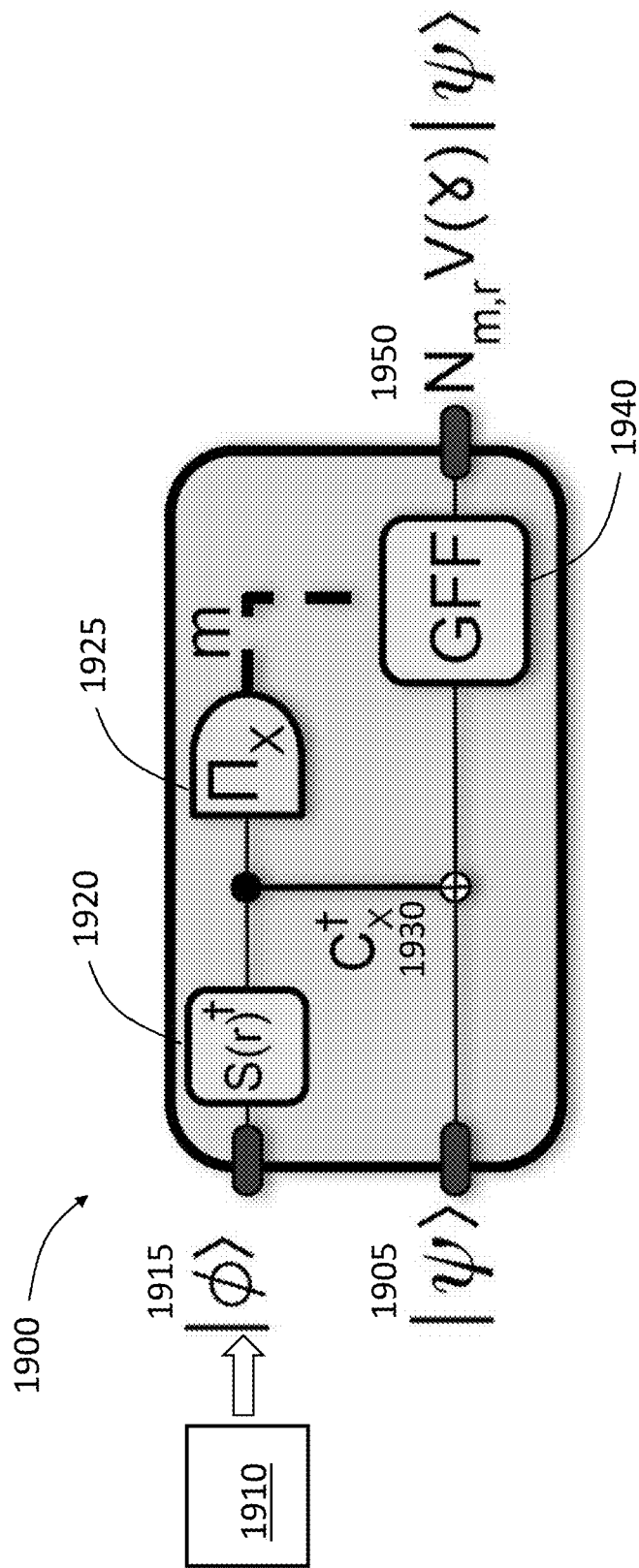
FIG. 19 is a schematic of an apparatus for GKP teleportation to implement a cubic phase gate, according to an embodiment.

FIG. 19 is a schematic of an apparatus 1900 for GKP teleportation to implement a cubic phase gate, according to an embodiment. The apparatus 1900 receives a first input state 1905 (labelled as state $|\psi\rangle$ ins FIG. 19) and a second input state 1915 (also referred to as a resource state $|\varphi\rangle$ ). The resource state 1915 is provided by an apparatus 1910, which can be similar to any one of the apparatus 100-500 shown in FIGS. 1A-5 or any other apparatus implementing the approach of generating non-Gaussian states described herein.

The apparatus 1900 also includes a squeezer 1920 (labelled as $S(r)^\dagger$) and a controlled-X gate 1930 (labelled as $C_X^\dagger$) given by $\exp[-i\hat{x}_1\hat{p}_2/2]$. An x-homodyne detector 1925 (labelled as $\Pi_x$) is included in the apparatus 1900 for x-homodyne measurement with outcome labeled as m. The apparatus also includes a Gaussian feed-forward (GFF) correction operator 1940 that is to be applied. $N_{m,r}$ denotes the noise operator, and $V(\gamma)$ is the final cubic phase gate that is applied to the input state.

Without being bound by any particular theory or mode of operation, the lowest-order quadrature phase gate, i.e., the cubic phase gate, can be written as $V(\gamma)=\exp[i\gamma\hat{x}^3/\hbar]$, where y is the gate strength. The teleportation technique of GKP can be translated into an adaptive gate teleportation presented using different gates and additional auxiliary squeezed states. $\hbar$ is set as 2 for the rest of the description.

For the cubic phase gate the resource state is the cubic phase state defined as $V(\gamma)|0\rangle_p$, which is non-physical due to the zero momentum ket $|0\rangle$. Therefore, as an approximation, one can consider $V(\gamma)S(r)^\dagger|0\rangle$, where $S(r)$ is the standard single-mode squeezing gate given by $S(r)=\exp[r(\hat{\alpha}^2-\hat{\alpha}^{\dagger 2})/2]$. For large squeezing, this state has a large Fock support and hence can be difficult to synthesize directly. To overcome this challenge, the squeeze operator can be commuted across the cubic phase gate to obtain $S(r)^\dagger V(\gamma')|0\rangle$. It can be further assumed that $\gamma' \ll 1$, then the cubic phase gate can be expanded to first-order in gate strength to obtain $S(r)^\dagger[1+i\gamma'\hat{x}^3/2]|0\rangle$.

The on-line squeezing gate can be applied using methods such as measurement-based squeezing and the resource state can be given by $|\varphi\rangle_\alpha = (1+5|\alpha|^2/2)^{-1/2}[|0\rangle + i\alpha\sqrt{3,2}|1\rangle + i a|3\rangle]$. The wavefunction of the squeezed resource state is:

$$\hat{\phi}(x) = \langle x | S(r)^\dagger | \phi \rangle = \int dx' \phi(x') \langle x | S(r)^\dagger | x' \rangle \quad (10)$$

In addition, $$\langle x | S(r)^\dagger | x' \rangle = e^{r/2} \langle x | e^r x' \rangle,$$

so $$\hat{\phi}(x) = e^{-r} \int dy \phi(e^{-r} y) e^{\frac{r}{2}} \delta(x - y) = e^{-r/2} \phi(e^{-r} x).$$

This squeezed resource state now can be used in a GKP teleportation scheme as shown in FIG. 19. The output state is:

$$|\psi_{out}\rangle = N\langle m^{(2)} | C_x^\dagger | \psi_{in}\rangle | \tilde{\phi}\rangle = N\tilde{\phi}(\hat{x} + m)|\psi_{in}\rangle = \quad (11)$$

$$N' \exp\left[-\frac{(\hat{x}+m)^2}{4e^{2r}}\right]\left[1 + \frac{2ia}{\sqrt{6}e^{3r}}\frac{(\hat{x}+m)^3}{2}\right]|\psi_{in}\rangle =$$

$$N' \exp\left[-\frac{(\hat{x}+m)^2}{4e^{2r}}\right]\left[1 + i\frac{\gamma}{2}(\hat{x}+m)^3\right]|\psi_{in}\rangle,$$

where $\gamma=2ae^{-3r}\sqrt{6}$, N' is the normalization factor, m is the homodyne measurement outcome, and $C_x=\exp[-i\hat{x}_1\hat{p}_2/2]$ is a gate that can be implemented. It is assumed that $\gamma \ll 1$, allowing the approximation of the term in the second square bracket as a first-order expansion in the gate strength of a cubic phase gate, resulting in:

$$|\psi_{out}\rangle = N' \exp\left[-\frac{(\hat{x}+m)^2}{4e^{2r}}\right] \exp\left[\frac{i\gamma(\hat{x}+m)^3}{2}\right]|\psi_{in}\rangle \quad (12)$$

Expanding the terms in the second operator and applying a Gaussian feed-forward $GFF(m)=\exp[3m\hat{x}^2+3m^2\hat{x}+m^3/2]$, the final action on the input state is obtained:

$$|\psi_{out}\rangle = N'N(m,r)V(65)|\psi_{in}\rangle \quad (13)$$

where $N(m,r)=\exp[-(\hat{x}+m)^2/(4e^{2r})]$ is the Gaussian damping noise operator that depends on the homodyne measurement outcome m.

In view of the above analysis, using the resource state $|\varphi\rangle$ provided by a non-Gaussian state resource, one can effect a transformation that is a weak cubic phase gate along with a Gaussian noise factor. The initial squeezing gate $S(r)^\dagger$ not only reduces the strength of the final cubic phase gate but also negates the effect of the Gaussian noise operator as seen from Equation (11).

Figure 20:
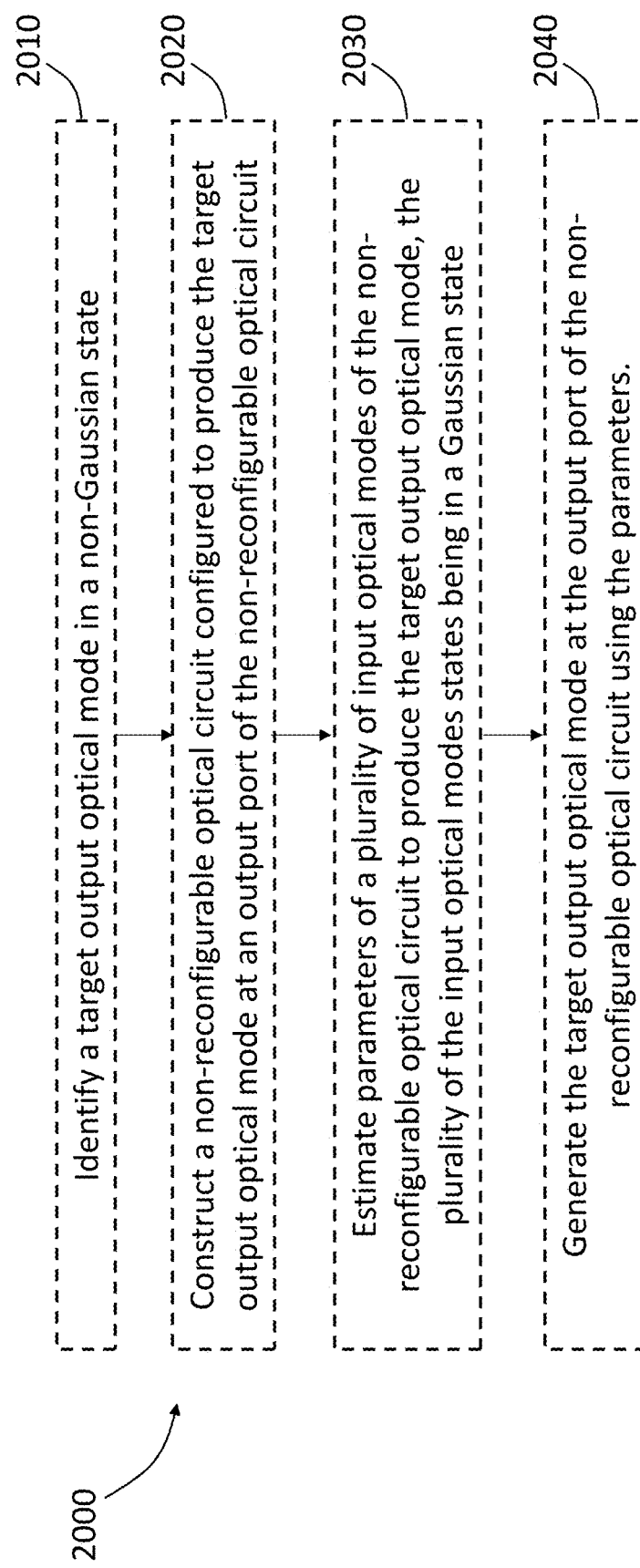
FIG. 20 is a flowchart illustrating a method of generating non-Gaussian states from Gaussian states, according to an embodiment.

FIG. 20 is a flowchart illustrating a method 2000 of generating output optical modes having non-Gaussian states from input optical modes having Gaussian states, according to an embodiment. The method 2000 includes, at 2010, identifying a target (desired) output optical mode in a non-Gaussian state. The method 2000 also includes, at 2020, constructing a non-reconfigurable ("fixed" configuration) optical circuit configured to produce the target output optical mode at an output port of the non-reconfigurable optical circuit. The optical circuit can be similar, for example, to the optical circuit in FIG. 1A, FIG. 1B, FIG. 2 or FIG. 3. The method 2000 also includes, at 2030, estimating parameters of a plurality of input optical modes of the optical circuit to produce the target output optical mode. The plurality of the input optical modes are in Gaussian states and can be characterized by their squeezing factors and displacements. Based on the parameters of the input optical modes, the target output optical mode is then generated at the output port of the non-reconfigurable optical circuit, at 2040. As shown in FIG. 20, the method 2000 can include all or some (i.e., any subset) of the steps 2010, 2020, 2030 and 2040.

Some or all of steps 2010, 2020, 2030 and 2040 can be processor-implemented, either by a common processor or by different processors.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    estimating at least one expected output optical mode of an optical circuit based on a target output optical mode in a non-Gaussian state;
    estimating a setting of the optical circuit to produce the at least one expected output optical mode;
    estimating parameters of a plurality of input optical modes of the optical circuit to produce the at least one expected output optical mode, each input optical mode from the plurality of the input optical modes being in a Gaussian state from a plurality of Gaussian states;
    reconfiguring (1) the optical circuit based on the setting, and (2) the plurality of input optical modes based on the parameters; and
    generating (1) the at least one expected output optical mode at a first output port, and (2) the target output optical mode at a second output port of the optical circuit.

2. The method of claim 1, wherein estimating the at least one expected output optical mode includes estimating an expected photon number in the at least one expected output optical mode.

3. The method of claim 1, wherein estimating the setting of the optical circuit includes:
calculating a plurality of candidate settings based on maximizing a fidelity of the optical circuit in generating the target output optical mode; and
selecting one candidate setting in the plurality of candidate settings as the setting of the optical circuit based on maximizing a success probability for the optical circuit to generate the target output optical mode.

4. The method of claim 1, wherein estimating the setting of the optical circuit includes estimating the setting of the optical circuit via a trained machine learning model executed by a processing device.

5. The method of claim 1, wherein estimating the parameters of the plurality of the input optical modes includes estimating a squeezing factor and a displacement of the plurality of input optical modes.

6. The method of claim 1, wherein generating the target output optical mode includes measuring a number of photons in the at least one expected output optical mode at the first output port of the optical circuit.

7. The method of claim 1, wherein generating the target output optical mode includes generating the target output optical mode in at least one of a Schrödinger's cat state, a Gottesman-Kitaev-Preskill (GKP) state, a weak cubic phase state, an M-mode W state, or a NOON state.

8. The method of claim 1, wherein generating the target output optical mode includes one of:
generating the target output optical mode in a Schrodinger's cat state at a success probability of about 10% or more; or generating the target output optical mode in a Gottesman-Kitaev-Preskill (GKP) state at a success probability of about 1% or more.

9. The method of claim 1, wherein the target output optical mode is a first target optical mode in a first non-Gaussian state, and the method further includes:
changing the setting of the optical circuit and the parameters of the plurality of the input optical modes of the optical circuit to generate a second target output optical mode in a second non-Gaussian state.

10. The method of claim 1, wherein:
the at least one expected output optical mode includes a plurality of expected output optical modes generated at a plurality of output ports of the optical circuit that includes a network of interconnected reconfigurable beamsplitters, and
the target output optical mode is generated at the second output port different from the plurality of output ports.

11. The method of claim 1, wherein the optical circuit is a first optical circuit, the method further comprises:
generating a plurality of non-Gaussian optical modes using a plurality of optical circuits that includes the first optical circuit, and
selecting one non-Gaussian optical mode from the plurality of non-Gaussian optical modes based on the target output optical mode.

12. The method of claim 1, wherein reconfiguring the optical circuit includes configuring at least one reconfigurable optical component based on the setting to entangle the plurality of input optical modes.

13. A method, comprising:
constructing a non-reconfigurable optical circuit configured to produce a target output optical mode in a non-Gaussian state, at an output port of the non-reconfigurable optical circuit;
estimating parameters of a plurality of input optical modes of the non-reconfigurable optical circuit to produce the target output optical mode, each input optical mode from the plurality of the input optical modes being in a Gaussian state from a plurality of Gaussian states;
reconfiguring the plurality of the input optical modes based on the parameters; and
generating the target output optical mode at the output port of the non-reconfigurable optical circuit using the parameters.

* * * * *